(12) United States Patent
Ogura

(10) Patent No.: US 11,736,536 B2
(45) Date of Patent: Aug. 22, 2023

(54) INFORMATION PROCESSING SYSTEM, SYSTEM, AND INFORMATION PROCESSING METHOD

(71) Applicant: Yoshihiro Ogura, Kanagawa (JP)

(72) Inventor: Yoshihiro Ogura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/738,017

(22) Filed: May 6, 2022

(65) Prior Publication Data

US 2022/0394065 A1 Dec. 8, 2022

(30) Foreign Application Priority Data

Jun. 2, 2021 (JP) ................................. 2021-093126

(51) Int. Cl.
*G06F 13/00* (2006.01)
*H04L 65/1069* (2022.01)

(52) U.S. Cl.
CPC .............................. *H04L 65/1069* (2013.01)

(58) Field of Classification Search
CPC .... H04L 65/1069; H04L 67/306; H04L 67/50
USPC ................ 709/227, 228, 229, 224
See application file for complete search history.

(56) References Cited

U.S. PATENT DOCUMENTS

| | | | |
|---|---|---|---|
| 6,199,099 B1* | 3/2001 | Gershman | G06F 16/9537 |
| | | | 709/201 |
| 2013/0073719 A1 | 3/2013 | Ando | |
| 2021/0034658 A1 | 2/2021 | Ogura | |
| 2021/0042064 A1 | 2/2021 | Ando | |
| 2021/0099513 A1 | 4/2021 | Ogura | |
| 2022/0392006 A1* | 12/2022 | Ogura | G06Q 50/205 |
| 2022/0394098 A1* | 12/2022 | Ando | G06K 7/1417 |

FOREIGN PATENT DOCUMENTS

JP 2019-153273 9/2019

\* cited by examiner

*Primary Examiner* — Kenneth R Coulter
(74) *Attorney, Agent, or Firm* — Xsensus LLP

(57) ABSTRACT

An information processing system includes circuitry to acquire an external system identification information identifying an external system to be linked through a touch point read with a user terminal used by a user, identify, based on registration information stored in the external system identified by the external system identification information and related to the user, attribute information indicating an attribute corresponding to a set location of the touch point through which a service corresponding to the attribute is to be provided, and transmit, to the user terminal, connection destination information indicating a connection destination of the service corresponding to the attribute.

16 Claims, 38 Drawing Sheets

FIG. 7

| SYSTEM ID | SYSTEM NAME | URL |
|---|---|---|
| S001 | SEAT RESERVATION SYSTEM | http://XXX.com/ |
| S002 | RECEPTION ROOM RESERVATION SYSTEM | http://YYY.com/ |
| S003 | APARTMENT MANAGEMENT SYSTEM | http://ZZZ.com/ |
| ... | ... | ... |

FIG. 8

| USER ID | PASSWORD | SERVICE USE HISTORY |
|---|---|---|
| TARO YOSHIDA <yoshida@xxx.kkk.com> | dddddd | WAGON SERVICE A: PURCHASE OF SOUVENIR A CONCIERGE A: DURATION OF TIME 4:15 TICKET SALES: PURCHASE OF MOVIE TICKET |
| HANAKO TAKAI <hanako@xxx.kkk.com> | eeeeee | WAGON SERVICE B: PURCHASE OF LUNCH BOX AND TEA BASEBALL STADIUM VENDOR A: PURCHASE OF BEER AT AA BASEBALL STADIUM |
| SABURO YAMADA <yamasabu@xxx.kkk.com> | gggggg | WAGON SERVICE C: USE WIFI CONNECTION: AREA POINT A |
| ... | ... | ... |

FIG. 9

| ADMINISTRATOR ID | PASSWORD |
|---|---|
| XXX@xxx.sss.com | ababab |
| XXX@yyy.sss.com | bcbcbc |
| XXX@zzz.sss.com | cdcdcd |
| ... | ... |

FIG. 10

SYSTEM ID: S001

| TOUCH POINT ID | ATTRIBUTE INFORMATION | | CONNECTION SERVICE INFORMATION | | PROVIDER INFORMATION | NOTE |
|---|---|---|---|---|---|---|
| | ATTRIBUTE NAME | ATTRIBUTE ID | CONNECTION SERVICE NAME | CONNECTION DESTINATION INFORMATION | | |
| T001 | GREEN CAR | P001 | WAGON SERVICE A | http://xxxxxxxxx.com | ABC@.mmm.com | ATTACH ON SEATS OF BULLET TRAIN |
| T001 | RESERVED SEAT | P002 | WAGON SERVICE B | http://xxxxxxxxxxxx.com | ABC@.mmm.com | |
| T001 | UNRESERVED SEAT | P003 | WAGON SERVICE C | http://yyyyyyyyyy.com | ABC@.mmm.com | |
| T002 | FIRST | P011 | WAGON SERVICE A | http://xxzzz.com | DEF@.rrr.com | ATTACH ON SEATS OF AIRPLANE |
| T002 | BUSINESS | P012 | WAGON SERVICE B | http://yyzzz.com | DEF@.rrr.com | |
| T002 | ECONOMY | P013 | WAGON SERVICE C | http://zzzzz.com | DEF@.rrr.com | |
| ... | ... | ... | ... | ... | ... | ... |

FIG. 11

| USER ID | PASSWORD | RESERVATION INFORMATION | | |
|---|---|---|---|---|
| | | DETAILS | SEAT INFORMATION | ATTRIBUTE ID |
| TARO YOSHIDA <yoshida@xxx.kkk.com> | dddddd | DEPARTURE 2021/5/15 13:00 BOUND FOR TOKYO | GREEN CAR, CAR 7, 10 A | P001 |
| HANAKO TAKAI <hanako@xxx.kkk.com> | eeeeee | DEPARTURE 2021/5/16 17:10 BOUND FOR HAKATA | RESERVED SEAT, CAR 13, 7E | P002 |
| SABURO YAMADA <yamasabu@xxx.kkk.com> | gggggg | DEPARTURE 2021/5/16 8:40 BOUND FOR SHIN OSAKA | UNRESERVED SEAT | P003 |
| ... | ... | ... | ... | ... |

| TOUCH POINT ID | URL |
|---|---|
| T001 | http://RXYZ.com/ |

FIG. 31A 600A
http://xxxxxx.com
WAGON SERVICE A
GREEN CAR, CAR 7, 10 A

Select Item ▼

Select Payment Method ▼

PURCHASE   CANCEL

A staff member will bring the item you purchased to your seat.

FIG. 31B 600B
http://xxxxxxxxxx.com
WAGON SERVICE B
RESERVED SEAT, CAR 13, 7E

Select Item ▼

Select Payment Method ▼

PURCHASE   CANCEL

Please come to a store in Car 8 to pick up the item you purchased before leaving.

FIG. 31C 600C
http://yyyyyyyyyy.com
WAGON SERVICE C
UNRESERVED SEAT

Welcome to Shinkansen.

You can buy lunch boxes, drinks, snacks, and memory items at a store in Car 8. We also have many other items.

Please visit to check.

FIG. 34

| TOUCH POINT ID | ATTRIBUTE INFORMATION | | CONNECTION SERVICE INFORMATION | | PROVIDER INFORMATION | NOTE |
|---|---|---|---|---|---|---|
| | ATTRIBUTE NAME | ATTRIBUTE ID | CONNECTION SERVICE NAME | CONNECTION DESTINATION INFORMATION | | |
| T101 | OFFICE A, RECEPTION ROOM A | P101 | TEA SERVING A | http://xyxyxy.com | GHI@.nnn.com | SET AT ENTRANCE OF EACH RECEPTION ROOM OF OFFICE A |
| T101 | OFFICE A, RECEPTION ROOM B | P102 | TEA SERVING B | http://zyzyzy.com | GHI@.nnn.com | |
| T101 | OFFICE A, RECEPTION ROOM C | P103 | ENTRY REGISTRATION | http://zxzxzx.com | — | |
| T102 | OFFICE B, RECEPTION ROOM 1 | P111 | TEA SERVING B | http://zyzyzy.com | JKL@.nnn.com | SET AT ENTRANCE OF EACH RECEPTION ROOM OF OFFICE B |
| T102 | OFFICE B, RECEPTION ROOM 2 | P112 | TEA SERVING B | http://zyzyzy.com | JKL@.nnn.com | |
| T102 | OFFICE B, RECEPTION ROOM 3 | P113 | TEA SERVING B | http://zyzyzy.com | JKL@.nnn.com | |
| ... | ... | ... | ... | ... | ... | ... |

SYSTEM ID: S002

FIG. 35

| USER ID | PASSWORD | RESERVATION INFORMATION ||||
| --- | --- | --- | --- | --- | --- |
| | | RESERVED DATE AND TIME | USERS | RECEPTION ROOM INFORMATION | ATTRIBUTE ID |
| TARO YOSHIDA <yoshida@xxx.kkk.com> | dddddd | 2021/5/15 13:00–14:00 | MEMBER(S): 2 GUEST(S): 3 | OFFICE A, RECEPTION ROOM A | P101 |
| HANAKO TAKAI <hanako@xxx.kkk.com> | eeeeee | 2021/5/16 8:00–12:00 | MEMBER(S): 5 GUEST(S): 4 | OFFICE B, RECEPTION ROOM 1 | P111 |
| SABURO YAMADA <yamasabu@xxx.kkk.com> | gggggg | 2021/5/16 15:00–17:40 | MEMBER(S): 1 GUEST(S): 2 | OFFICE A, RECEPTION ROOM C | P103 |
| ⋮ | ⋮ | ⋮ | ⋮ | ⋮ | ⋮ |

GHI@.nnn.com

TEA SERVING A

DETAILS
TO: ALL USERS (5)
ITEMS: COFFEE 5 CUPS

RECEPTION ROOM:
OFFICE A, RECEPTION ROOM A

RESERVATION INFORMATION
RESERVED BY: TARO YOSHIDA
DATE AND TIME:
2021/5/15  13:00–14:00
USERS: MEMBER(S)2,GUEST(S)3

DONE

JKL@.nnn.com

TEA SERVING B

DETAILS
TO: GUESTS  (4)
ITEMS: COFFEE 4 CUPS

RECEPTION ROOM:
OFFICE A, RECEPTION ROOM B

RESERVATION INFORMATION
RESERVED BY: HANAKO TAKAI
DATE AND TIME:
2021/5/16  8:00–12:00
USERS: MEMBER(S)5,GUEST(S)4

DONE

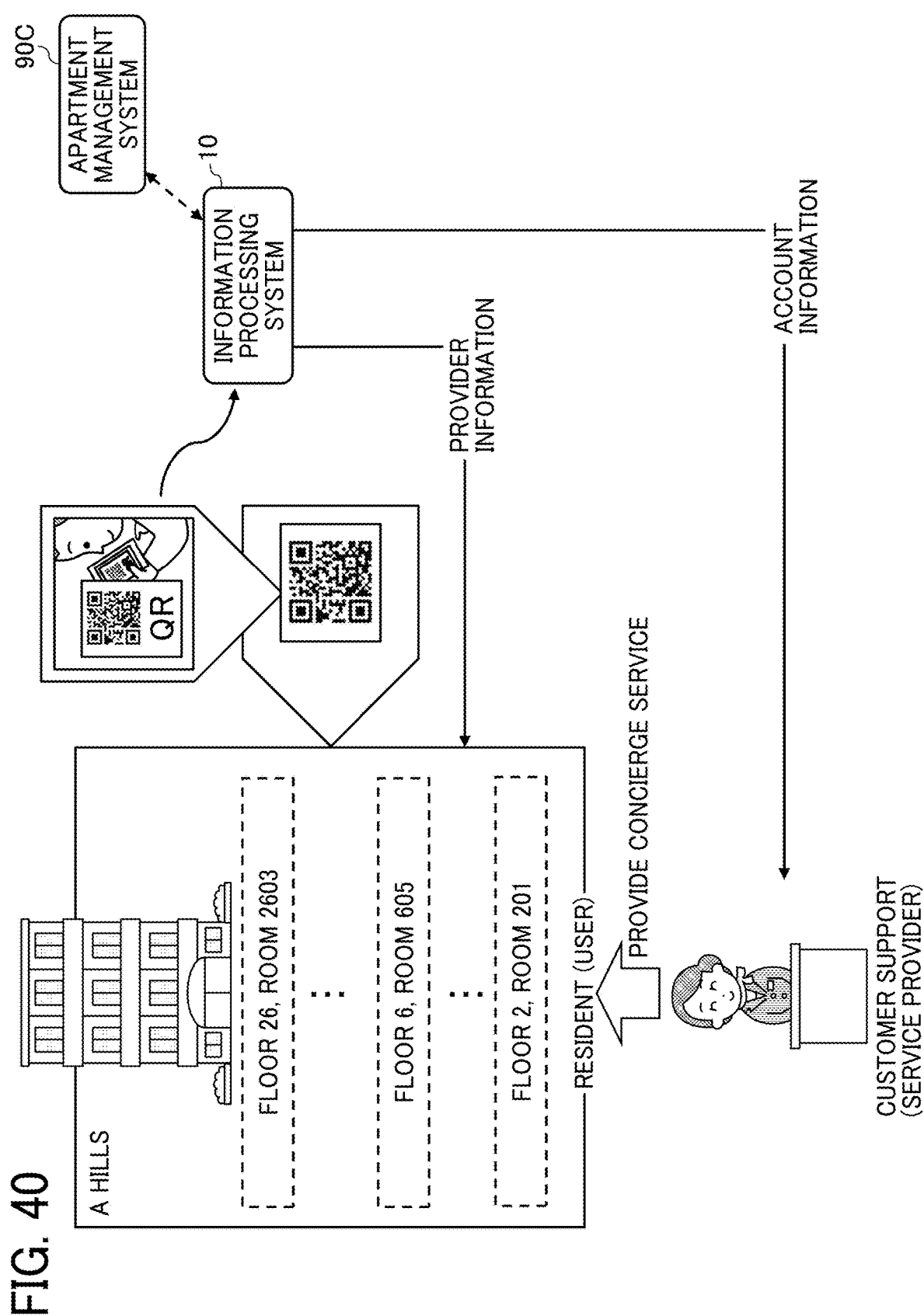

FIG. 41

| SYSTEM ID: S003 | ATTRIBUTE INFORMATION | | CONNECTION SERVICE INFORMATION | | PROVIDER INFORMATION | NOTE |
|---|---|---|---|---|---|---|
| TOUCH POINT ID | ATTRIBUTE NAME | ATTRIBUTE ID | CONNECTION SERVICE NAME | CONNECTION DESTINATION INFORMATION | | |
| T201 | A HILLS VIP | P201 | CONCIERGE A | MNO@jkj.com | MNO@jkj.com | SET IN EACH ROOM OF A HILLS |
| T201 | A HILLS STANDARD | P202 | CONCIERGE B | PQR@jkj.com | PQR@jkj.com | |
| T202 | B HEIGHTS VIP | P211 | CONCIERGE A | MNO@jkj.com | MNO@jkj.com | SET IN EACH ROOM OF B HEIGHTS |
| T202 | B HEIGHTS STANDARD | P212 | CONCIERGE B | PQR@jkj.com | PQR@jkj.com | |
| ... | ... | ... | ... | ... | ... | ... |

FIG. 42

| USER ID | PASSWORD | CONTRACT INFORMATION | |
|---|---|---|---|
| | | RESIDENCE INFORMATION | ATTRIBUTE ID |
| TARO YOSHIDA <yoshida@xxx.kkk.com> | dddddd | A HILLS, FLOOR 26, ROOM 2603 | P201 |
| HANAKO TAKAI <hanako@xxx.kkk.com> | eeeeee | A HILLS, FLOOR 6, ROOM 605 | P202 |
| SABURO YAMADA <yamasabu@xxx.kkk.com> | gggggg | B HEIGHTS, FLOOR 10, ROOM 1001 | P212 |
| ... | ... | ... | ... | though

INFORMATION PROCESSING SYSTEM, SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2021-093126, filed on Jun. 2, 2021, in the Japan Patent Office, the entire disclosure of which is hereby incorporated by reference herein.

BACKGROUND

Technical Field

Embodiments of this disclosure relate to an information processing system, a system, and an information processing method.

Related Art

A cloud service with which a user easily uses a service registered in advance by reading, with a device such as a smartphone, a QR code (registered trademark) or a tag identification (ID) set in a device or a room or embedded online is known.

For example, a smartphone transmits an ID obtained by reading a tag or a QR code and a user ID to a server, and the server provides a service associated with a combination of the ID and the user ID to a user or a device.

SUMMARY

An embodiment of the present disclosure includes an information processing system including circuitry to acquire an external system identification information identifying an external system to be linked through a touch point read with a user terminal used by a user, identify, based on registration information stored in the external system identified by the external system identification information and related to the user, attribute information indicating an attribute corresponding to a set location of the touch point through which a service corresponding to the attribute is to be provided, and transmit, to the user terminal, connection destination information indicating a connection destination of the service corresponding to the attribute.

An embodiment of the present disclosure includes a system including an information processing system including information processing system circuitry and a user terminal including user terminal circuitry. The information processing system circuitry acquires an external system identification information identifying an external system to be linked through a touch point read with the user terminal used by a user, identifies, based on registration information stored in the external system identified by the external system identification information and related to the user, attribute information indicating an attribute corresponding to a set location of the touch point through which a service corresponding to the attribute is to be provided, and transmits, to the user terminal, connection destination information indicating a connection destination of the service corresponding to the attribute. The user terminal circuitry reads the touch point, transmits, to the information processing system circuitry, information obtained in reading the touch point, and accesses the connection destination indicated by the connection destination information transmitted from the information processing system circuitry to control a display to display a service use screen.

An embodiment of the present disclosure includes an information processing method including acquiring an external system identification information identifying an external system to be linked through a touch point read with a user terminal used by a user, identifying, based on registration information stored in the external system identified by the external system identification information and related to the user, attribute information indicating an attribute corresponding to a set location of the touch point through which a service corresponding to the attribute is to be provided, and transmitting, to the user terminal, connection destination information indicating a connection destination of the service corresponding to the attribute.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a conceptual diagram illustrating an example of an external system management table according to the exemplary embodiment;

FIG. 8 is a conceptual diagram illustrating an example of a user information management table according to the exemplary embodiment;

FIG. 9 is a conceptual diagram illustrating an example of an administrator information management table according to the exemplary embodiment;

FIG. 10 is a conceptual diagram illustrating an example of a touch point management table according to the exemplary embodiment:

FIG. 11 is a diagram illustrating an example of registration information stored in an external system according to the exemplary embodiment;

FIG. 31A, FIG. 31B, and FIG. 31C are diagrams each illustrating an example of a service use screen displayed on the user terminal according to the exemplary embodiment:

FIG. 34 is a conceptual diagram illustrating an example of a touch point management table according to the exemplary embodiment:

FIG. 35 is a diagram illustrating an example of registration information stored in an external system according to the exemplary embodiment;

FIG. 39A and FIG. 39B are diagrams each illustrating an example of a service provider screen displayed on the provider terminal according to the exemplary embodiment;

FIG. 40 is a schematic diagram illustrating an example of a service provided by linking with an apartment management system according to the exemplary embodiment;

FIG. 41 is a conceptual diagram illustrating an example of a touch point management table according to the exemplary embodiment;

FIG. 42 is a diagram illustrating an example of registration information stored in an external system according to the exemplary embodiment.

Figure 1:
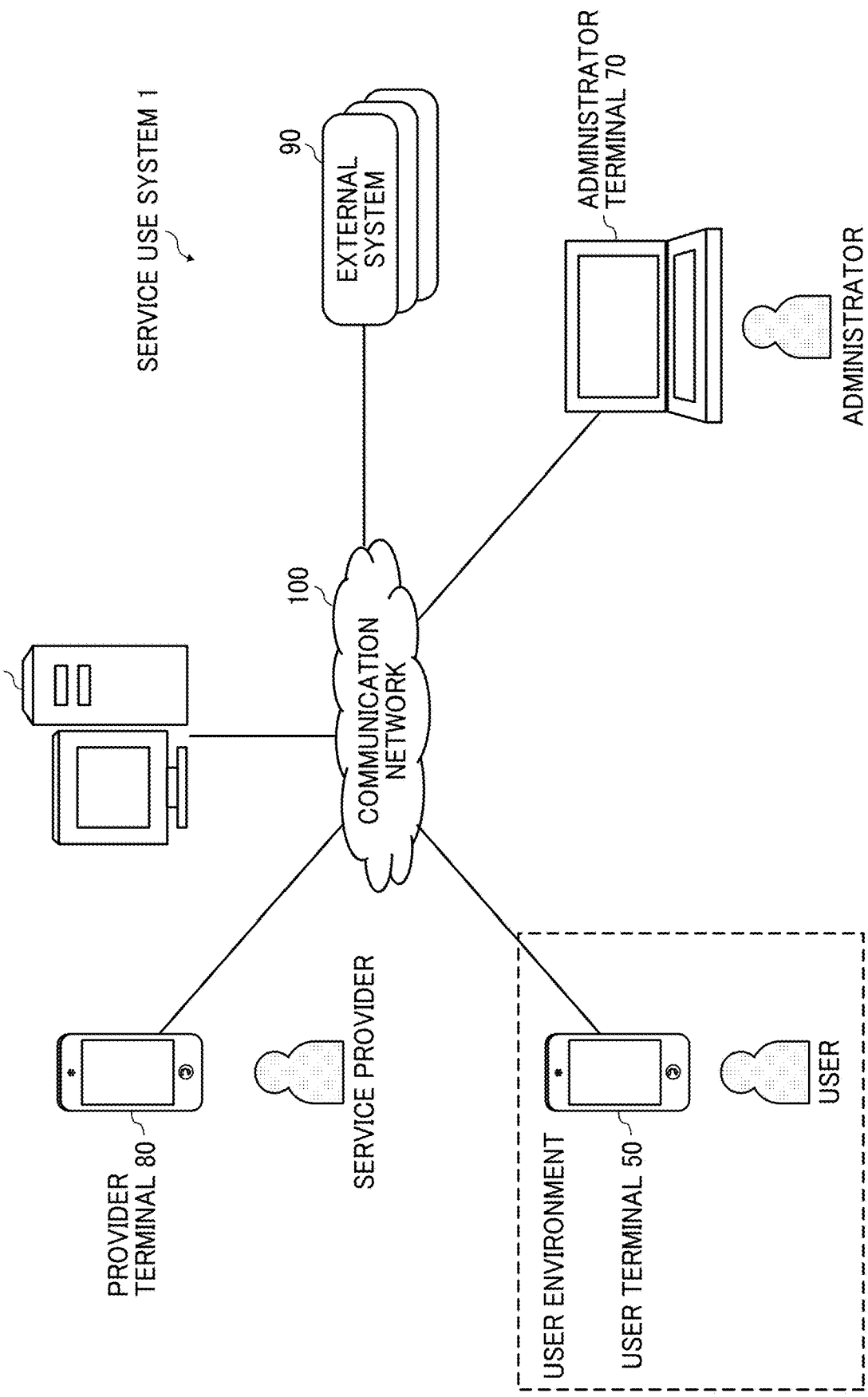
FIG. 1 is a diagram illustrating an overall configuration of a service use system according to an exemplary embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the description of the drawings, the same elements are denoted by the same reference numerals, and redundant descriptions thereof are omitted.

Embodiment

System Configuration:

FIG. 1 is a diagram illustrating an example of an overall configuration of a service use system. A service use system 1 illustrated in FIG. 1 is a system in which a user terminal 50 reads a touch point 40 set in a predetermined user environment, and thereby an information processing system 10 provides various types of services each of which is linked with an external system 90 to a user.

The service use system 1 includes the information processing system 10, the user terminal 50, an administrator terminal 70, and a provider terminal 80. The information processing system 10, the user terminal 50, the administrator terminal 70, and the provider terminal 80, which are included in the service use system 1, communicably connected to each other via a communication network 100. The communication network 100 includes the Internet, a mobile communication network, and a local area network (LAN), for example. The communication network 100 includes a network by not only wired communications but also a network by wireless communications such as 3rd generation (3G), 4th generation (4G), 5th generation (5G), Wireless Fidelity (Wi-Fi) (registered trademark), Worldwide Interoperability for Microwave Access (WiMAX) or Long Term Evolution (LTE).

The service use system 1 provides various types of services to the user through a touch point by integrating the information processing system 10 with the external system 90. The external system 90 may be any system that provides a specific type of service to a user by cooperating with the information processing system 10. Examples of the external system 90 include a seat reservation system for a public transportation such as a bullet train or an airplane, a reception room reservation system in an office, and an apartment management system used by a management company that manages an apartment residence contract. The above-described examples of the external system 90 are not limiting. Examples of the external system 90 further include systems that provides services for various businesses or operations such as manufacturing industry, construction and civil engineering, real estate, transportation, welfare and care, medical care, sightseeing, retail, and a local government.

The information processing system 10 is a server computer that executes processing for providing a predetermined connection service to a user who uses the user terminal 50 by cooperating with the external system 90. The information processing system 10 may be implemented by a single server computer or may be implemented by a plurality of server computers. The description is given of an example in which the information processing system 10 is a server computer that resides in a cloud environment. In another example, the information processing system 10 is a server that resides in an on-premises environment. In addition, the information processing system 10 may include a device having a server function installed in a user environment.

The user terminal 50 is a computer such as a smartphone used by a user. The user terminal 50 reads the touch point 40 set in the user environment to use a predetermined connection service provided by the information processing system 10 integrated with the external system 90. The administrator terminal 70 is a computer such as a laptop personal computer (PC) used by the administrator by who services to be provided to users are settable. The provider terminal 80 is a computer such as a smartphone used by the service provider who provides services to users in user environments.

The administrator who uses the administrator terminal 70 may be the service provider who uses the provider terminal 80. In this case, the function of the administrator terminal 70 may be included in the provider terminal 80 used by the service provider who is also the administrator. Each of the user terminal 50, the administrator terminal 70, and the provider terminal 80 is not limited to a smartphone or a laptop PC, and may be, for example, a tablet terminal, a wearable terminal, or a smartwatch.

The touch point 40 indicates a contact point between the user terminal 50 carried by the user and a specific service, for providing the specific service to the user. The user terminal 50 reads the touch point 40 to acquire information for accessing the specific service. The service is provided to the user via the information processing system 10, such as a server computer or a device. The touch point 40, which is a contact point, is implemented by, for example, an image, an information medium, or a communication device and provides information. More specifically, the touch point 40 is implemented by an image such as a two-dimensional code including a QR code (registered trademark), an information medium that reads information using short-range communications such as a near field communication (NFC) tag or a radio frequency identification (RFID) tag, or a communication device that transmits information using near-distance wireless communications such as Bluetooth (registered trademark) or ultrasonic waves, for example. The image of the two-dimensional code may be printed on a paper medium or may be displayed on a display device such as a display.

Figure 2:
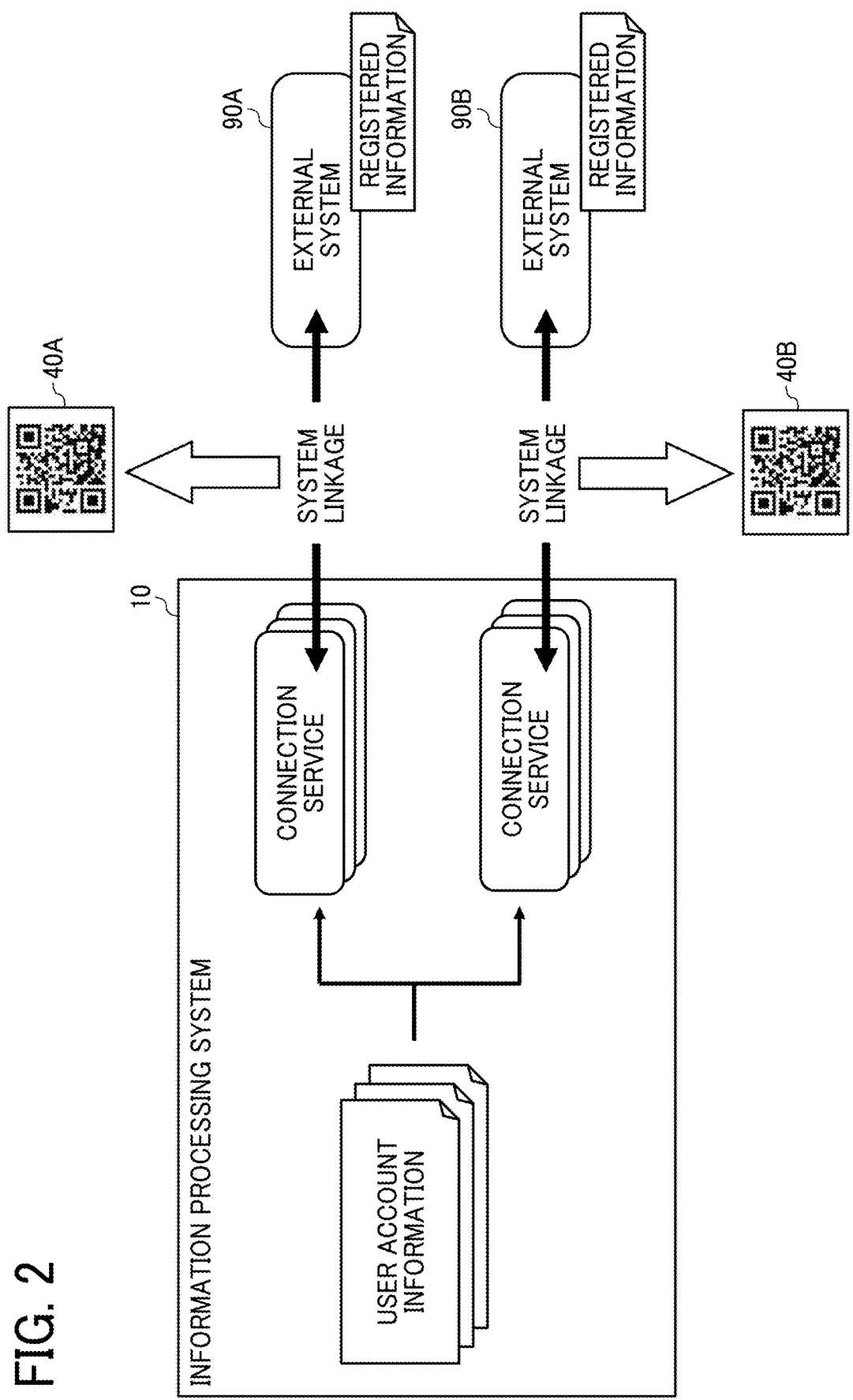
FIG. 2 is a diagram illustrating an example of an outline of a system linkage (system integration) between the information processing system and the external system in the service use system.

FIG. 2 is a diagram illustrating an example of an outline of a system linkage (system integration) between the information processing system and the external system in the service use system. The information processing system 10 stores account information of each user who is allowed to use various types of services to be provided. The information processing system 10 provides a connection service that varies for each user by using the stored account information. The connection service is a service of which details are settable by linking with each type of external system 90. Different connection services set to be provided by linking with the same external system 90 is created in association with the same touch point 40, and the same touch point 40 is to be set for a plurality of locations in a user environment by a worker who sets the touch point 40.

Figure 3:
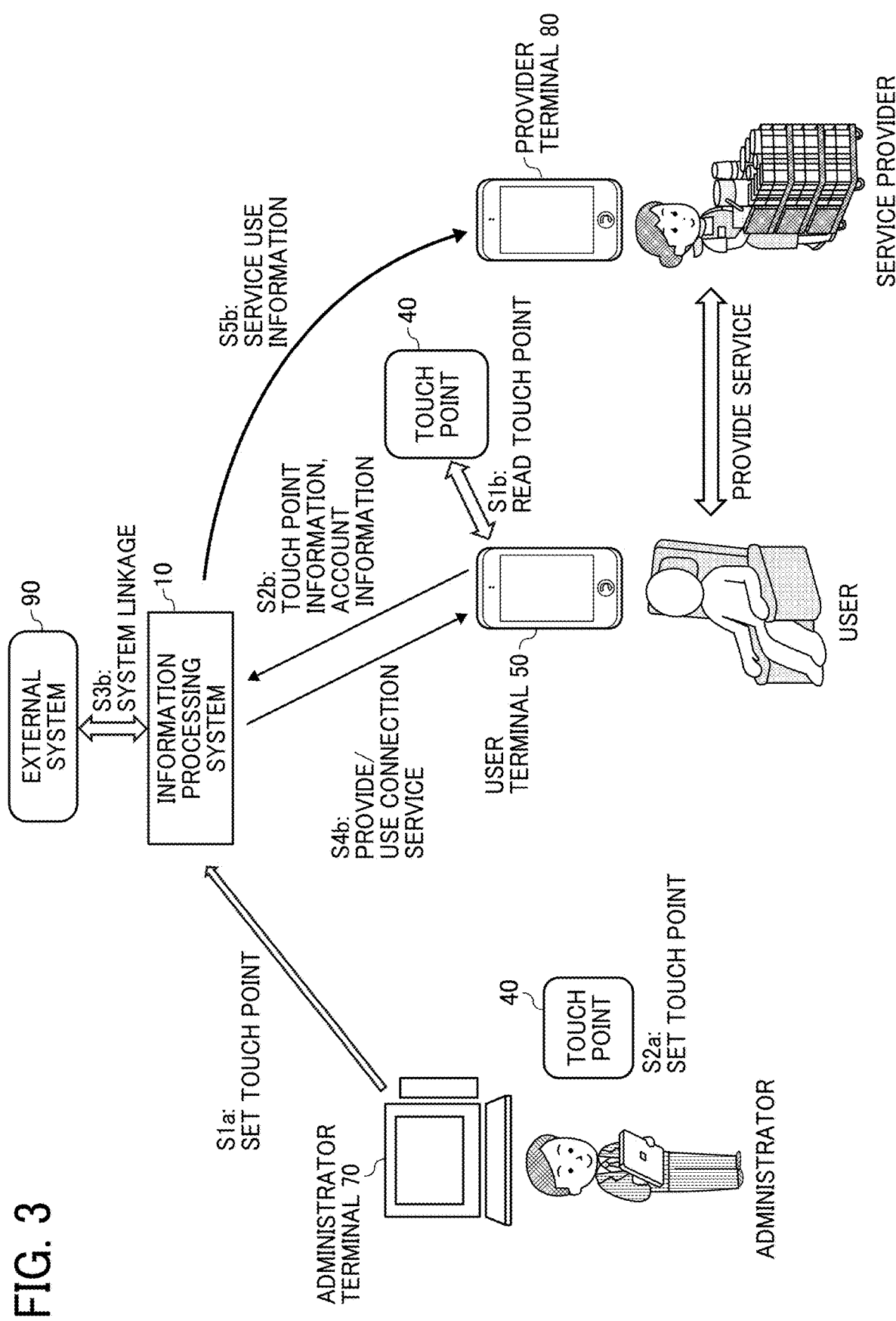
FIG. 3 is a diagram illustrating an outline of a process performed by the service use system according to the exemplary embodiment.

FIG. 3 is a diagram illustrating an example of an outline of a process performed by the service use system. In the example illustrated in FIG. 3, each user reads the touch point and uses a predetermined service that is provided by system linkage with a seat reservation system, which is an example of the external system 90, in a bullet train, which is an example of the user environment. With reference to FIG. 3, the outline of the process of the service use system 1 according to the present embodiment is briefly described. A detailed description of functions implemented by the service use system 1 is given later with reference to other drawings.

The administrator uses the administrator terminal 70 to set a touch point to be read by the user. The administrator terminal 70 sets a touch point with the information processing system 10 according to input operations of the administrator (step S1*a*). In response to a request from the administrator terminal 70, the information processing system 10 sets the touch point. The set touch point is associated with the external system 90 to be linked (in the example, the seat reservation system), attributes each of which indicating a set position of the touch point, and connection services each of which is to be provided for a corresponding one of the attributes. Based on information set with the information processing system 10, the administrator outputs the touch point 40 to be set at, or attached on, each seat of the bullet train (step S2*a*). The touch point 40 set at, or attached on, each seat of the bullet train is common to all the seats and does not depend on where to set (set location). The touch point is, for example, an image such as a QR code (registered trademark).

Each user who gets on the bullet train reads the set touch point 40 with the user terminal 50 (step S1*b*). Then, the user terminal 50 transmits touch point information obtained by reading the touch point 40 and the own account information to the information processing system 10 (steps S2*b*). The information processing system 10 cooperates with the external system 90 based on the touch point information and the account information received from the user terminal 50, and identifies the seat of the user who has read the touch point 40 and a connection service corresponding to the seat of the user (step S3b). Then, the information processing system 10 provides the connection service corresponding to an attribute indicating the seat of the user to the user terminal 50, and the user terminal 50 uses the service by accessing the connection service (step S4b).

The information processing system 10 transmits service use information in relation to the user to the provider terminal 80 used by the service provider who is a staff member working on the bullet train (step S5b). This service use information includes information to identify the seat of the user along with the service use history of the user. Then, the service provider checks the service use history of the user and the seat of the user and goes to the seat of the user who is using the connection service to provide a service (for example, a wagon service).

In case of a related art in which each of different services is provided according to a set position, or a set location, of a touch point, such as a QR code, in providing the service to be used through each touch point, each touch point is created for a corresponding one of the different services, and a worker sets each touch point at a corresponding predetermined position in a user environment, resulting in heavy workload. In addition, in case of a related art in which the same touch point that does not depend on a set position, or a set location, is used to be set, information on where a user has read the set touch point, namely for example, a location of a seat of the user who has read the touch point 40, is not obtained by the service provider, resulting in failing to provide the service to the target user. In addition, in case of a related art in which the same touch point that does not depend on a set position, or a set location, is used to be set, a location of the user is registered in the system in advance in order to provide one of different services to a user according to a set position of the touch point, resulting in complexity in presetting and difficulty in designing a system in a flexible manner to support various services.

To cope with the above-described matter of each related art, the service use system 1 according to the present embodiment sets a combination of an attribute indicating a location at which the touch point 40 is read and a connection service corresponding to the attribute in association with user registration information that is registered in the information processing system 10 with the linked external system 90. Accordingly, even when the same touch point that does not depend on a set position, or a set location, is read, the service use system 1 successfully provides a corresponding one of the different services according to the location where the user reads the touch point 40 by using the registration information related to the user registered in the external system 90. In an environment in which all services are digitized and available to be linked with each other, the service use system 1 links the information processing system 10 with each of various external systems 90 to provide an appropriate service to the user for use based on registration information of the user registered in each external system 90. In addition, by using the same touch point 40 that does not depend on a set position, the service use system 1 according to the present embodiment reduces the workload of a worker who sets the touch point 40 while providing, an appropriate service corresponding to a location where a user reads the touch point 40.

Hardware Configuration:

A hardware configuration of a device or a terminal included in the service use system according to the present embodiment is described below with reference to FIG. 4 and FIG. 5. Each hardware configuration of the device or terminal illustrated in FIG. 4 or FIG. 5 may have elements added or deleted as appropriate.

Figure 4:
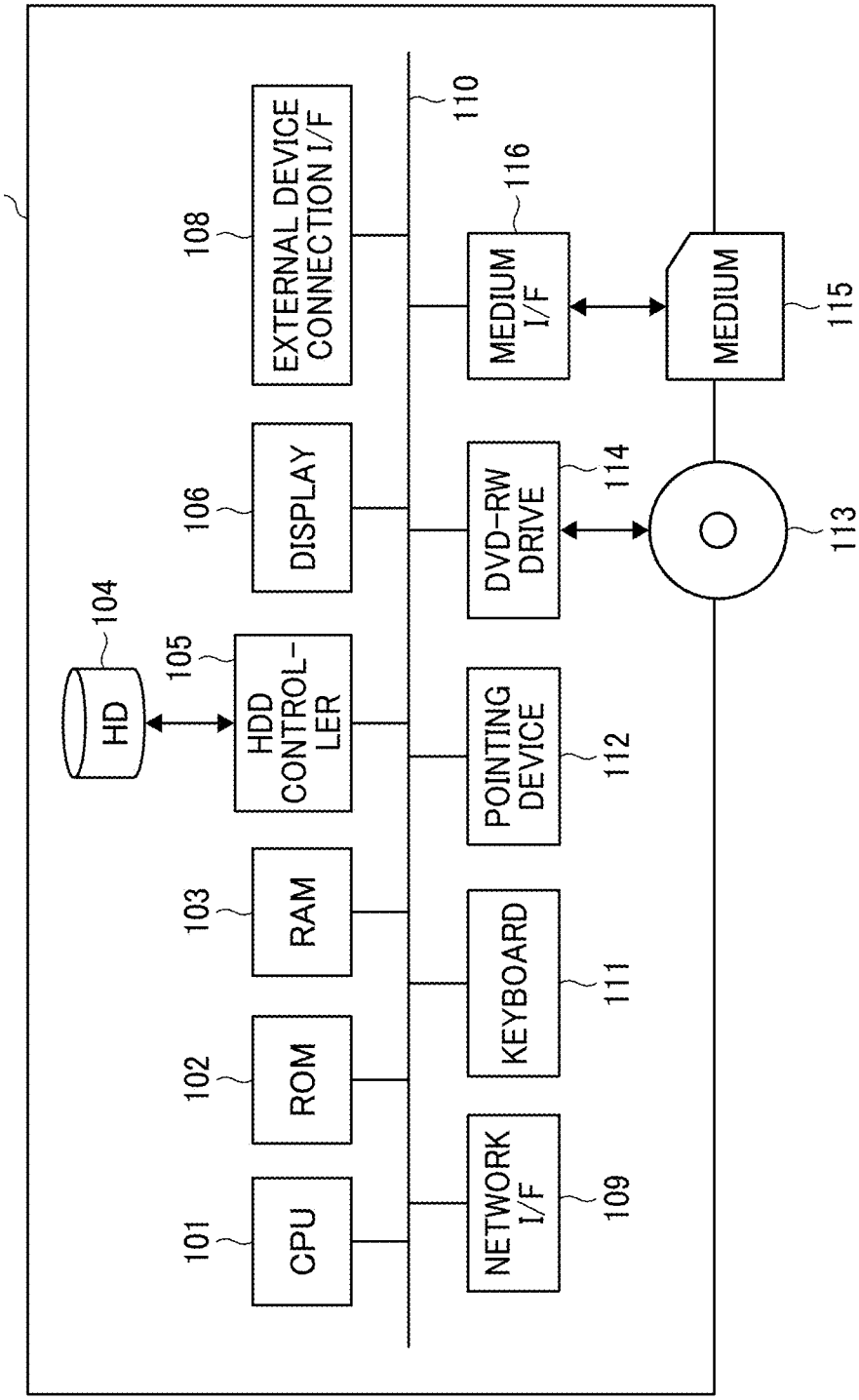
FIG. 4 is a block diagram illustrating a hardware configuration of an information processing system according to the exemplary embodiment.

Hardware Configuration of Information Processing System:

FIG. 4 is a block diagram illustrating an example of a hardware configuration of the information processing system. Each hardware element of the information processing system 10 is denoted by a reference numeral in 100 series. The information processing system 10 is implemented by a computer, and as illustrated in FIG. 4, includes a central processing unit (CPU) 101, a read only memory (ROM) 102, a random access memory (RAM) 103, a hard disk (HD) 104, a hard disk drive (HDD) controller 105, display 106, an external device connection interface (I/F) 108, a network (I/F) 109, a bus line 110, a keyboard 111, a pointing device 112, a digital versatile disc rewritable (DVD-RW) drive 114 and a medium I/F 116.

The CPU 101 performs overall control of the information processing system 10. The ROM 102 stores a program used for driving the CPU 101, such as an initial program loader (IPL). The RAM 103 is used as a work area for the CPU 101. The HD 104 stores various data such as a program. The HDD controller 105 controls reading or writing of various data from or to the HD 104 under control of the CPU 101. The display 106 displays various types of information such as a cursor, a menu, a window, characters, or an image. In one example, the display 106 is a touch panel display provided with an input device. The external device connection I/F 108 is an interface for connecting to various external devices. The network I/F 109 is an interface that controls communication of data with an external device through the communication network 100. The bus line 110 is, for example, an address bus or a data bus, which electrically connects the elements such as the CPU 101 illustrated in FIG. 4.

The keyboard 111 is an example of an input device including a plurality of keys for inputting characters, numerical values, or various instructions. The pointing device 112 is an example of an input device that allows a user to select or execute a specific instruction, select processing to be executed, or move a cursor being displayed. The keyboard 111 and the pointing device 112 are merely examples of the input device. As another example of the input device, a touch panel or a voice input device may be used. The DVD-RW drive 114 controls reading or writing of various data from or to a DVD-RW 113, which is an example of a removable recording medium. The removable recording medium is not limited to the DVD-RW and may be a digital versatile disk-recordable (DVD-R), or a BLU-RAY (registered trademark) disc (BLU-RAY disk), for example.

A disc (Blu-ray disc) may also be used as the removable recording medium. The medium I/F 116 controls reading or writing (storing) of data with respect to a storage medium 115 such as a flash memory.

Figure 5:
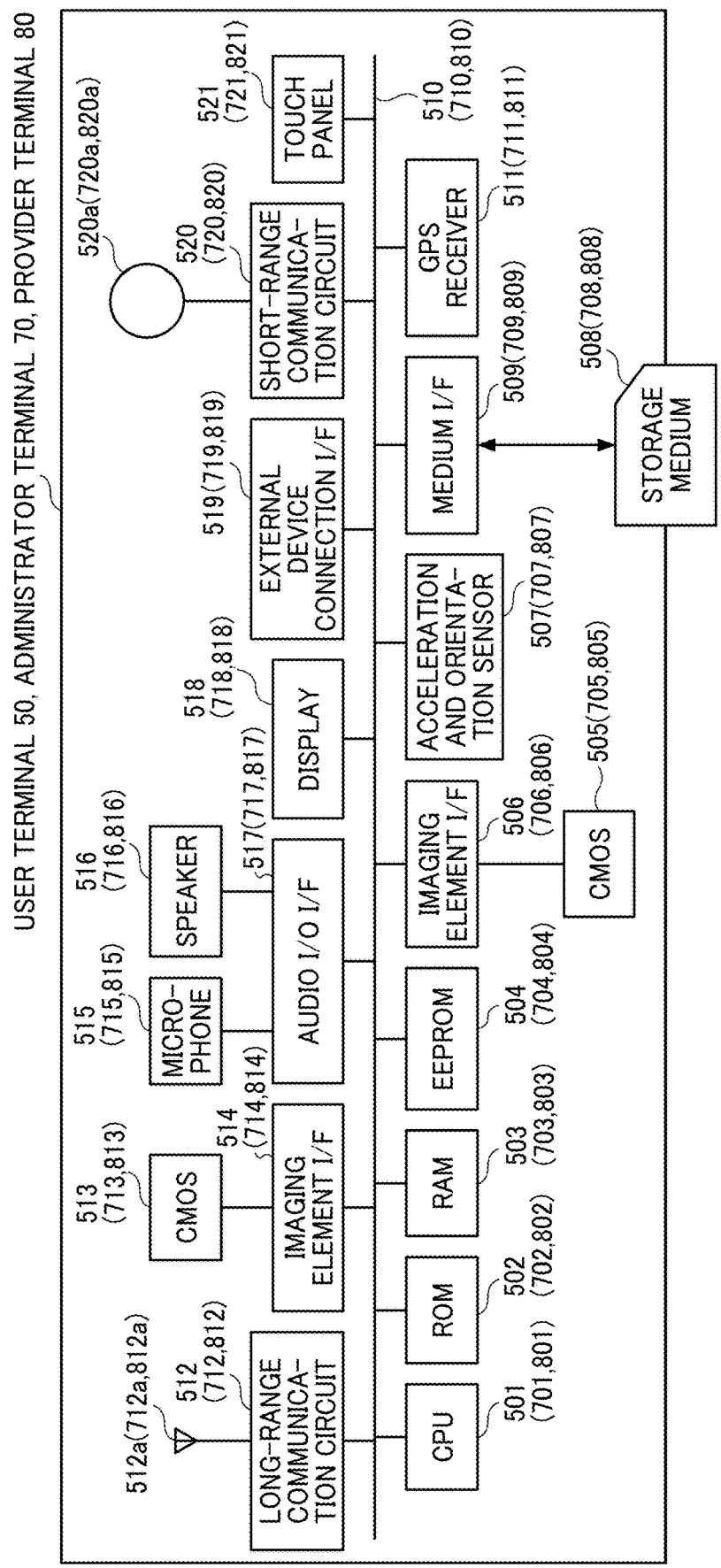
FIG. 5 is a diagram illustrating a hardware configuration of each of a user terminal, an administrator terminal, and a provider terminal according to the exemplary embodiment.

Hardware Configuration of User Terminal:

FIG. 5 is a block diagram illustrating an example of a hardware configuration of the user terminal. Each hardware element of the user terminal 50 is denoted by a reference numeral in 500 series. The user terminal 50 is implemented by a computer, and as illustrated in FIG. 5, includes a CPU 501, a ROM 502, a RAM 503, an electrically erasable PROM (EEPROM) 504, a complementary metal oxide semiconductor (CMOS) sensor 505, an imaging element I/F 506, an acceleration and orientation sensor 507, a medium I/F 509, and a global positioning system (GPS) receiver 511.

The CPU 501 performs overall control of the user terminal 50. The ROM 502 stores programs such as an initial program loader (IPL) to boot the CPU 501.

The RAM 503 is used as a work area for the CPU 501. The EEPROM 504 reads or writes various data such as a control program for user terminals under control of the CPU 501. The CMOS sensor 505 is an example of a built-in imaging device that captures an object (mainly, a self-image of a user) under control of the CPU 501 and obtains image data. In alternative to the CMOS sensor 505, an imaging element such as a charge-coupled device (CCD) sensor may be used. The imaging element I/F 506 is a circuit that controls driving of the CMOS sensor 505. Examples of the acceleration and orientation sensor 507 include various sensors such as an electromagnetic compass to detect geomagnetism, a gyrocompass, and an accelerometer. The medium I/F 509 controls reading or writing (storing) of data with respect to a storage medium 508 such as a flash memory. The GPS receiver 511 receives a GPS signal from a GPS satellite.

The user terminal 50 further includes a long-range communication circuit 512, a CMOS sensor 513, an imaging element I/F 514, a microphone 515, a speaker 516, an audio input and output (I/O) I/F 517, a display 518, an external device connection I/F 519, a short-range communication circuit 520, an antenna 520a of the short-range communication circuit 520, and a touch panel 521.

The long-range communication circuit 512 is a circuit to communicate with other devices through the communication network 100. The CMOS sensor 513 is an example of a built-in imaging device that captures an object under control of the CPU 501 and obtains image data. The imaging element I/F 514 is a circuit that controls driving of the CMOS sensor 513. The microphone 515 is a built-in circuit that converts sound into electric signals. The speaker 516 is a built-in circuit that converts electric signals into physical vibrations to produce sounds such as music and voice. The audio I/O I/F 517 is a circuit for inputting or outputting audio signals between the microphone 515 and the speaker 516 under control of the CPU 501. The display 518 is an example of a display device that displays an image of an object, various icons, etc. Examples of the display 518 include a liquid crystal display (LCD) and an organic electroluminescence (EL) display. The external device connection I/F 519 is an interface for connecting to various external devices. The short-range communication circuit 520 is a communication circuit that communicates in compliance with NEAR FIELD COMMUNICATION (NFC) (Registered Trademark), BLUETOOTH (Registered Trademark), or the like. The touch panel 521 is an example of an input device that allows a user to operate the user terminal 50 by touching a screen of the display 518.

The user terminal 50 also includes a bus line 510. The bus line 510 is, for example, an address bus or a data bus, which electrically connects the elements such as the CPU 501 illustrated in FIG. 5.

Hardware Configuration of Administrator Terminal:

FIG. 5 is a block diagram illustrating an example of a hardware configuration of the administrator terminal. Each hardware element of the administrator terminal 70 is denoted by a reference numeral in 700 series. The administrator terminal 70 is implemented by a computer and has substantially the same configuration as that of the user terminal 50 illustrated in FIG. 5, and thus the description of the hardware configuration is omitted.

Hardware Configuration of Provider Terminal:

FIG. 5 is a block diagram illustrating an example of a hardware configuration of the provider terminal. Each hardware element of the provider terminal 80 is denoted by a reference numeral in 800 series. The provider terminal 80 is implemented by a computer and has substantially the same configuration as that of the user terminal 50 illustrated in FIG. 5, and thus the description of the hardware configuration is omitted.

Each of the above-described control programs may be recorded in a file in a format installable or executable on a computer-readable recording medium for distribution. Examples of the recording medium include, but not limited to, a compact disc recordable (CD-R), a digital versatile disc (DVD), a BLU-RAY (registered trademark) disc, a secure digital (SD) card, and a universal serial bus (USB) memory. In addition, such recording media may be provided in the domestic markets or foreign markets as program products. For example, the information processing system 10 implements an information processing method according to an embodiment of the present disclosure by executing a program according to an embodiment of the present disclosure.

Figure 6:
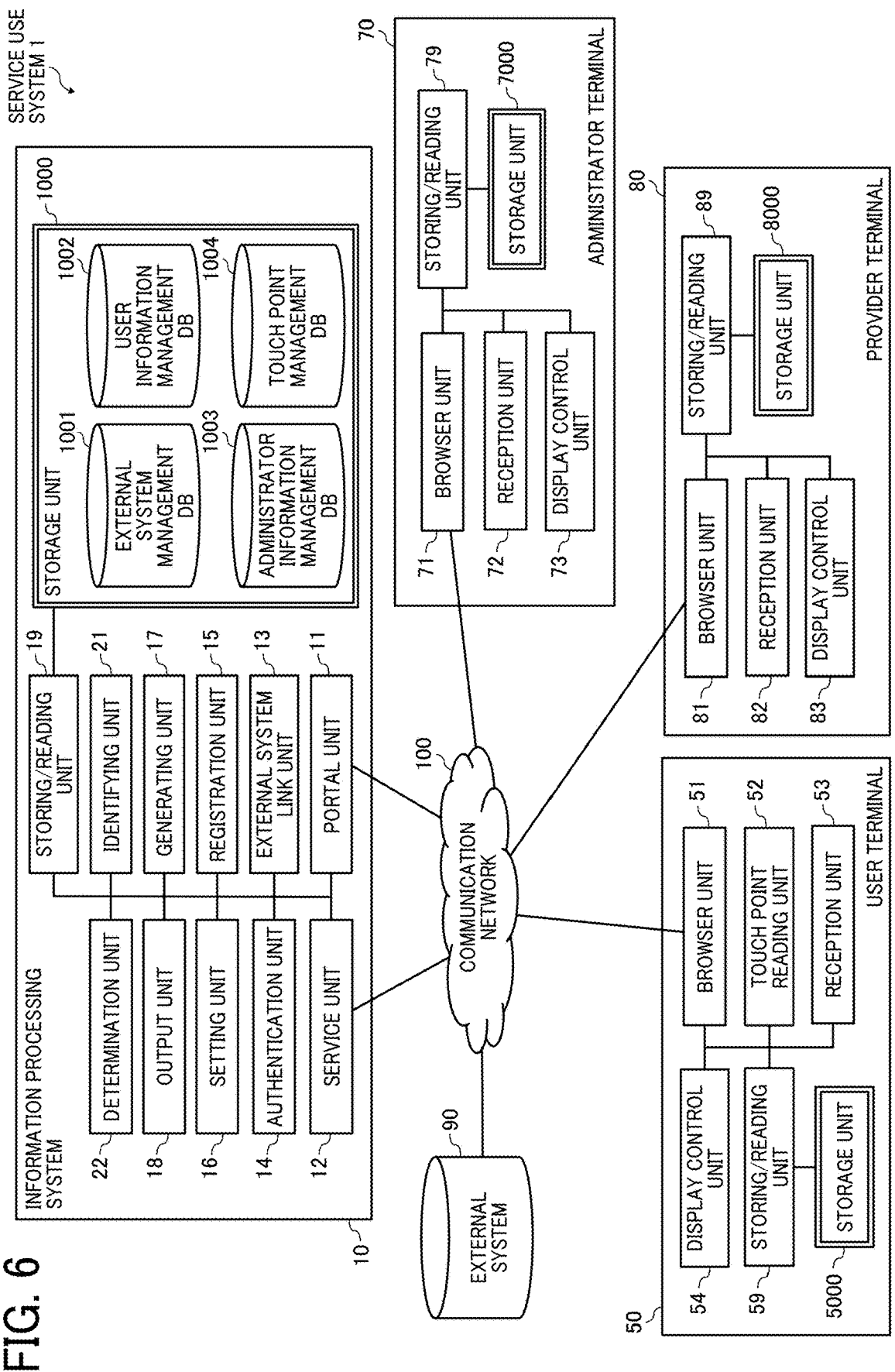
FIG. 6 is a block diagram illustrating a functional configuration of the service use system according to the exemplary embodiment.

Functional Configuration:

A functional configuration of the service use system according to the present embodiment of the disclosure is described below with reference to FIG. 6 to FIG. 11. FIG. 6 is a block diagram illustrating an example of a functional configuration of the service use system. Note that devices or terminals illustrated in FIG. 6 are ones among from the devices or the terminals illustrated in FIG. 1 and related to processing or operation described latter.

Functional Configuration of Information Processing System.

A functional configuration of the information processing system 10 is described below with reference to FIG. 6. The information processing system 10 includes a portal unit 11, a service unit 12, an external system link unit 13, an authentication unit 14, a registration unit 15, a setting unit 16, a generating unit 17, an output unit 18, an identifying unit 21, a determination unit 22, and a storing/reading unit 19. The above-described units are functions implemented by operating any of the hardware elements illustrated in FIG. 4 in cooperation with instructions of the CPU 101 according to the program, which is for information processing systems, expanded to the RAM 103. The information processing system 10 includes a storage unit 1000 implemented by the ROM 102, the HD 104, or the storage medium 115 illustrated in FIG. 4.

The portal unit 11 is mainly implemented by processing of the CPU 101 in relation to the network I/F 109 and transmits or receives various data or information to or from other devices or terminals through the communication network 100. The service unit 12 is mainly implemented by processing of the CPU 101 and provides the various types of services to the user terminal 50 through the touch point 40.

The external system link unit 13 is mainly implemented by processing of the CPU 101 in relation to the network I/F 109 and links with the external system 90 via the communication network 100. The authentication unit 14 is implemented by processing of the CPU 101 and performs authentication processing to authenticate each of the users managed by the information processing system 10.

The registration unit 15 is implemented mainly by processing of the CPU 101 and registers the external system 90 to be linked through the touch point 40. The setting unit 16 is mainly implemented by processing of the CPU 101 and sets a combination of an attribute and a connection service type, in association with the touch point 40. The generating unit 17 is mainly implemented by processing of the CPU 101 and generates, based on various types of information set by the setting unit 16, touch point information that is information obtained when the user terminal 50 reads the touch point 40.

The output unit 18 is mainly implemented by processing of the CPU 101 and outputs the touch point information generated by the generating unit 17. The method of outputting the touch point information includes various output methods according to a form of the touch point 40, and includes, for example, printing, displaying, writing to an information medium, and setting with a communication device. For example, in a case where the touch point 40 is an image such as a two-dimensional code, the output unit 18 outputs the touch point information by printing the image on a paper medium or displaying the image on a display. In addition, in a case where the touch point 40 is an information medium that reads information using short-range communications by an NFC tag or an RFID tag, the output unit 18 outputs the touch point information by writing the touch point information in the information medium, for example. In addition, in a case where the touch point 40 is a communication device that transmits information using short-range wireless communications such as BLUETOOTH or ultrasonic waves, the output unit 18 outputs the touch point information by setting the communication device to transmit the touch point information, for example. The identifying unit 21 is mainly implemented by processing of the CPU 101 and identifies attribute information indicating a set position (or a set location) where the touch point 40 is set, a connection service associated with each attribute, or provider information indicating a service provider that provides the service, using information stored in the touch point management database (DB) 1004, based on touch point information and user account information that are acquired. The determination unit 22 is implemented by processing of the CPU 101 and executes various determinations.

The storing/reading unit 19 is mainly implemented by processing of the CPU 101 and stores various types of data or information in the storage unit 1000 or reads various types of data or information from the storage unit 1000.

External System Management Table:

FIG. 7 is a conceptual diagram illustrating an example of an external system management table. The external system management table is a table for managing the external systems 90 that are to be linked with the information processing system 10. The storage unit 1000 stores an external system management DB 1001, which is implemented by the system management table as illustrated in FIG. 7.

The external system management table stores external system information in which a system ID and a system name each of which identifies the corresponding external system 90 and a uniform resource locator (URL) for accessing the corresponding external system 90 are associated with each other. The system ID or the system name is an example of external system identification information.

User Information Management Table:

FIG. 8 is a conceptual diagram illustrating an example of a user information management table, according to the present embodiment. The user information management table is a table for managing various types of information on a user who is to use a connection service to be provided by the information processing system 10. The storage unit 1000 includes a user information management DB 1002 including the user information management table as illustrated in FIG. 8.

The user information management table stores a user ID identifying a user, a password, and service use history corresponding to the user with each other. The service use history indicates records of using each type of service used by a corresponding user. The user ID is account information such as an e-mail address of the user. The account information of the user is an example of user identification information for identifying the user. In addition, in the service use history, records of using each type of service used by the user through the touch point 40 in the past is registered, and each service provided by linking with the corresponding external system 90 is included. The information processing system uses information of the service use history for each user, for example, for adding a recommendation function for giving recommendations to the user when providing the connection service to the user terminal 50 that has read the touch point 40.

Administrator Information Management Table:

FIG. 9 is a conceptual diagram illustrating an example of an administrator information management table. The administrator information management table is a table for managing various types of information related to an administrator who has authority to perform linkage setting of a service to be provided through the touch point 40. The storage unit 1000 includes an administrator information management DB 1003 including the administrator information management table as illustrated in FIG. 9.

In the administrator information management table, an administrator ID for identifying an administrator and a password are associated with each other. The administrator ID is account information such as an e-mail address of the administrator.

Touch Point Management Table:

FIG. 10 is a conceptual diagram illustrating an example of a touch point management table. The touch point management table is a table for managing various types of information set for each touch point 40. The storage unit 1000 includes a touch point management DB 1004 including the touch point management table as illustrated in FIG. 10.

In the touch point management table, for each system ID for identifying the corresponding external system 90, a touch point ID for identifying the touch point 40, attribute information indicating an attribute that is a set position, or a set location, of the touch point 40, connection service information indicating a connection service to be provided to the user terminal 50 reading the touch point 40 for each attribute, and provider information identifying a service provider providing a service to a user who uses the connection service in association with each other. The touch point ID is an example of touch point identification information.

The attribute information includes an attribute name and an attribute ID for identifying an attribute that is a set position, or a set location, indicating where the touch point 40 is set. The connection service information includes a connection service name for identifying a connection service and connection destination information indicating a connection destination for accessing the connection service. The connection destination information is, for example, a URL for accessing a corresponding connection service. The provider information is account information of a service provider.

The touch point management table as illustrated in FIG. 10 is a table for managing various types of information set for each touch point 40 in case of linking with the seat reservation system (system ID. S001) that is one of the external systems 90. In the example illustrated in FIG. 10, with respect to the touch point ID of "T001", the attribute of "GREEN CAR" and the connection service of "WAGON SERVICE A" are associated with each other, the attribute of "RESERVED SEAT" and the connection service of "WAGON SERVICE B" are associated with each other, and the attribute of "unreserved seat" and the connection service of "WAGON SERVICE C" are associated with each other. In addition, all combinations of attributes and connection services associated with the touch point ID of "T001" are associated with "ABC@.mmm.com" that is an account of the service provider. The touch point 40 corresponding to the touch point ID "T001" is set in each seat of the bullet train. The user who has read the touch point 40 receives service corresponding to a type of the seat from a staff member who is the service provider.

The "WAGON SERVICE A" that is one of the connection services is a service in which the service provider (a staff member) goes to the seat of each user (passenger) of the green car and delivers an item purchased or ordered by the user accessing the connection service. The "WAGON SERVICE B" that is one of the connection services is a service in which the service provider (a staff member) puts aside an item purchased or ordered by each user (passenger) of the reserved seat by accessing the connection service in a store in a car of the bullet train. In the case of the "WAGON SERVICE B," the user visits to the store to pick up the item purchased or ordered. The "WAGON SERVICE C" that is one of the connection services is a service that is provided to each user (passenger) of the unreserved seat, and with which purchasing or ordering an item is unavailable, but gives a guidance to the user to visit a store in a car of the bullet train. Note that the connection services or details of each service provided from the service provider when the connection service is being used are not limited thereto, and can be appropriately settable according to settings for the touch point 40, which is performed as described above.

In addition, with respect to the touch point ID of "T002", the attribute of "FIRST" and the connection service of "WAGON SERVICE A" are associated with each other, the attribute of "BUSINESS" and the connection service of "WAGON SERVICE B" are associated with each other, and the attribute of "ECONOMY" and the connection service of "WAGON SERVICE C" are associated with each other. In addition, all combinations of attributes and connection services associated with the touch point ID of "T002" are associated with "DEF@.rrr.com" that is an account of the service provider. The touch point 40 corresponding to the touch point ID "T002" is set in each seat of an aircraft. The user who has read the touch point 40 receives the service corresponding to the type of seat from a staff member who is the service provider.

As described above, with the touch point management table, each of the different combinations of attributes, connection services, and service providers is set and managed for the touch point 40 that does not depend on a set position, or a set location. Accordingly, the information processing system 10 allows each user to access the connection service of which a site to be connected varies according to the set position (set location) of the touch point 40 read by the user, and allows the service provider to obtain information on a position (seat) where the user who uses the service is.

Functional Configuration of User Terminal:

A functional configuration of the user terminal 50 is described below with reference to FIG. 6. The user terminal 50 includes a browser unit 51, a touch point reading unit 52, a reception unit 53, a display control unit 54, and a storing/reading unit 59. The above-described units are functions implemented by operating any of the hardware elements illustrated in FIG. 5 in cooperation with instructions of the CPU 501 according to the program, which is for user terminals, expanded to the RAM 503 from the EEPROM 504. The user terminal 50 includes a storage unit 5000 implemented by the ROM 502 or the storage medium 508 illustrated in FIG. 5.

The browser unit 51 is mainly implemented by processing of the CPU 501 and is implemented by a general web browser. The touch point reading unit 52 is mainly implemented by processing of the CPU 501, reads the touch point 40, and activates the browser unit 51. The method of reading the touch point 40 corresponds to the method of providing information from the touch point 40. For example, when the touch point 40 is an image of a two-dimensional code, the touch point reading unit 52 reads the touch point 40 by capturing the image. In addition, in a case where the touch point 40 is an information medium that reads information using short-range communications by an NFC tag or an RFID tag, the touch point reading unit 52 reads the touch point 40 by reading the information by short-range communications, for example. In addition, in a case where the touch point 40 is a communication device that transmits information using near-distance wireless communications such as BLUETOOTH or ultrasonic waves, the touch point reading unit 52 reads the touch point 40 by receiving the information by near-distance wireless communications, for example.

The reception unit 53 is mainly implemented by processing of the CPU 501 and receives various selections or inputs from the user. The display control unit 54 is mainly implemented by processing of the CPU 501 and causes a display unit such as the display 518 to display various screens.

The storing/reading unit 59 is mainly implemented by processing of the CPU 501 and stores various data or information in the storage unit 5000 or reads various data or information from the storage unit 5000.

Functional Configuration of Administrator Terminal:

A functional configuration of the administrator terminal 70 is described below with reference to FIG. 6. The administrator terminal 70 includes a browser unit 71, a reception unit 72, a display control unit 73, and a storing/reading unit 79. The above-described units are functions implemented by operating any of the hardware elements illustrated in FIG. 5 in cooperation with instructions of the CPU 701 according to the program, which is for administrator terminals, expanded to the RAM 703 from the EEPROM 704. The administrator terminal 70 includes a storage unit 7000 implemented by the ROM 702 or the storage medium 708 illustrated in FIG. 5.

The browser unit 71 is mainly implemented by processing of the CPU 701 and is implemented by a general web browser. The browser unit 71 transmits and receives various types of data or information to and from other devices or terminals via the communication network 100 by activating a web browser.

The reception unit 72 is mainly implemented by processing of the CPU 701 and receives various selections or inputs from the administrator. The display control unit 73 is mainly implemented by processing of the CPU 701 and causes a display unit such as the display 718 to display various screens.

The storing/reading unit 79 is mainly implemented by processing of the CPU 701 and stores various data or information in the storage unit 7000 or reads various data or information from the storage unit 7000.

Functional Configuration of Provider Terminal:

A functional configuration of the provider terminal 80 is described below with reference to FIG. 6. The provider terminal 80 includes a browser unit 81, a reception unit 82, a display control unit 83, and a storing/reading unit 89. The above-described units are functions implemented by operating any of the hardware elements illustrated in FIG. 5 in cooperation with instructions of the CPU 801 according to the program, which is for provider terminals, expanded to the RAM 803 from the EEPROM 804. The provider terminal 80 includes a storage unit 8000 implemented by the ROM 802 or the storage medium 808 illustrated in FIG. 5.

The browser unit 81 is mainly implemented by processing of the CPU 801 and is implemented by a general web browser. The browser unit 81 transmits and receives various types of data or information to and from other devices or terminals via the communication network 100 by activating a web browser.

The reception unit 82 is mainly implemented by processing of the CPU 801 and receives various selections or inputs from the service provider. The display control unit 83 is mainly implemented by processing of the CPU 801 and causes a display unit such as the display 818 to display various screens.

The storing/reading unit 89 is implemented mainly by the processing of the CPU 801 and stores various data (or information) in the storage unit 8000 and reads various data (or information) from the storage unit 8000.

External System Registration Information:

Registration information stored in the external system 90 is described below with reference to FIG. 11. FIG. 11 is a diagram illustrating an example of the registration information stored in an external system. The external system 90 stores, for each user, registration information corresponding to a service to be provided the user. FIG. 1I is a diagram illustrating an example of the registration information stored in the seat reservation system that is an example of the external system 90. In the registration information illustrated in FIG. 11, a user ID for identifying a user, a password, and reservation information registered in the seat reservation system are associated with each other.

The user ID and the password are account information of a user who uses the seat reservation system. In the following description of the present embodiment, the account information is shared with the information processing system 10 and is the same as the user account information illustrated in FIG. 7. In some embodiments, each of the information processing system 10 and the external system 90 uses account information that is individually registered in the corresponding system. In such a case in which the information processing system 10 uses the account information that is not the same one used by the external system 90, the information processing system 10 further holds information for associating the account information with the one used by the external system 90, with respect to the same user.

The reservation information includes reservation details for each user, seat information on a seat, and an attribute ID for identifying an attribute of the seat. The attribute IDs are same as the ones stored in the touch point management table illustrated in FIG. 10. As the reservation information, the details are registered, for each external system 90, according to each type of service to be provided by the external system 90.

Processes or Operation: Process of Linking with Service:

Processes and operations performed by the service use system according to the present embodiment is described below with reference to FIG. 12 to FIG. 43. A process of linking with a service in relation to a predetermined service to be provided through the touch point 40 in the service use system 1 is described with reference to FIG. 12 to FIG. 27.

Figure 12:
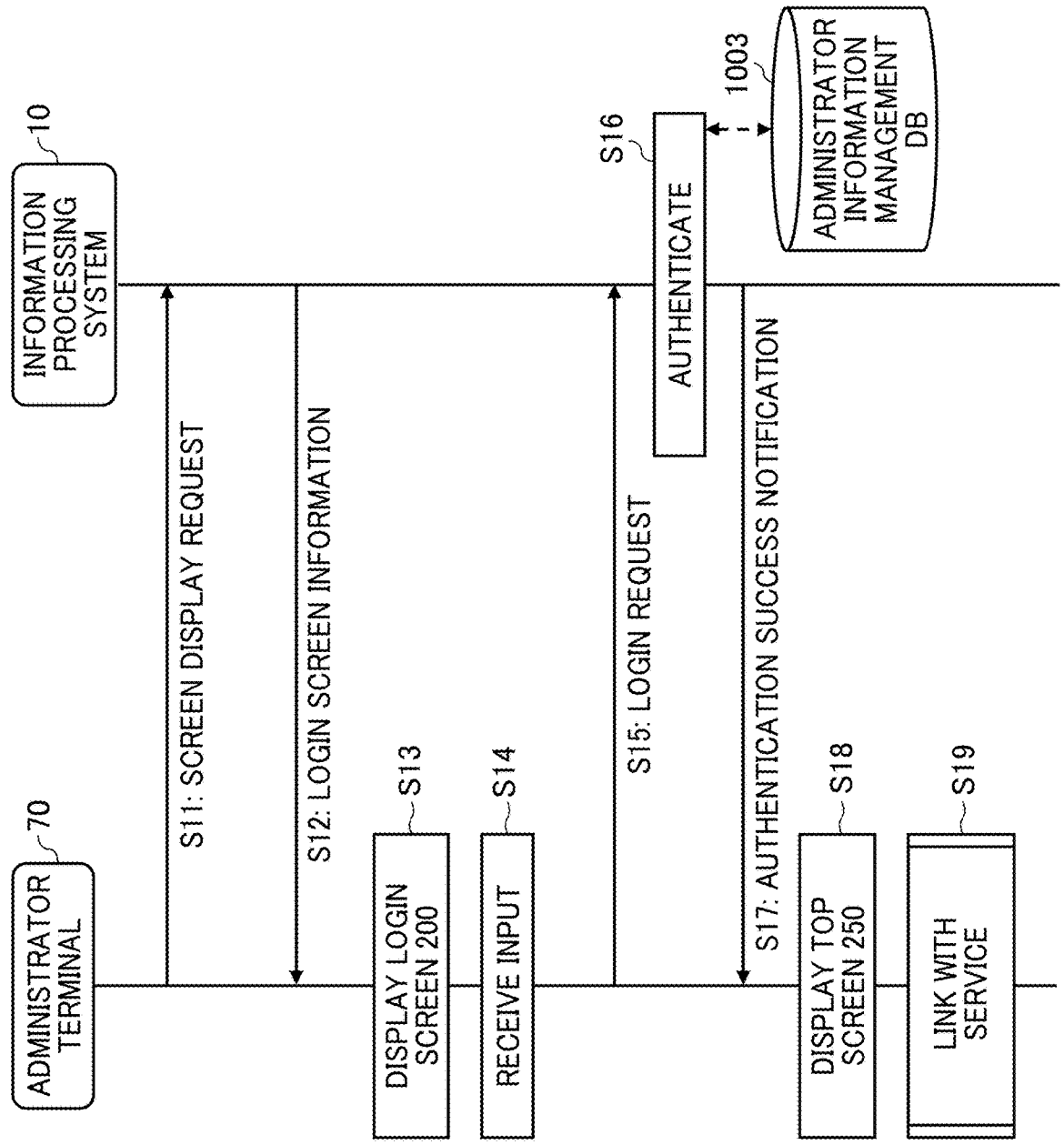
FIG. 12 is a sequence diagram illustrating an example of a process of linking with a service according to the exemplary embodiment.

FIG. 12 is a sequence diagram illustrating an example of the process of linking with a service.

The browser unit 71 of the administrator terminal 70 transmits a screen display request to the information processing system 10 in response to a predetermined input operation performed by the administrator (step S11). The portal unit 11 of the information processing system 10 receives the screen display request transmitted from the administrator terminal 70. Then, the portal unit 11 of the information processing system 10 transmits login screen information for displaying a login screen to the administrator terminal 70 that is a request source (step S12). The browser unit 71 of the administrator terminal 70 receives the login screen information transmitted from the information processing system 10.

Figure 13:
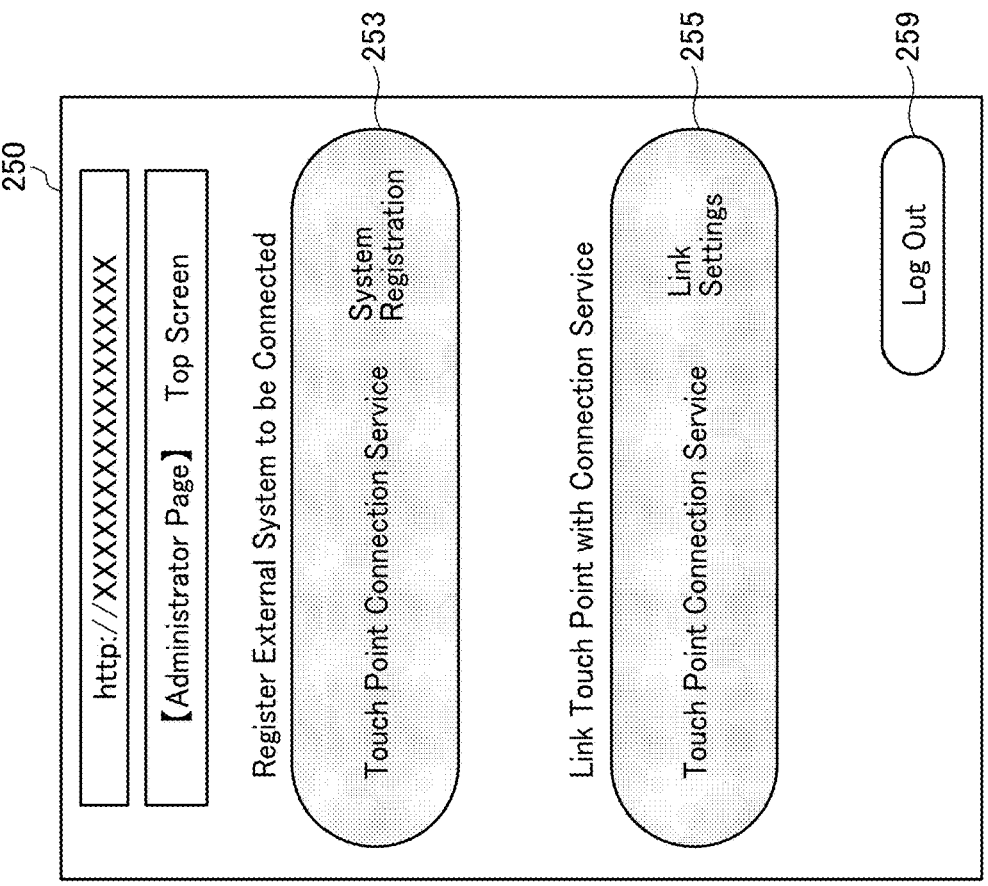
FIG. 13 is a diagram illustrating an example of a login screen displayed on the administrator terminal according to the exemplary embodiment.

Subsequently, based on the login screen information received in step S12, the display control unit 73 of the administrator terminal 70 causes a display unit such as the display 718 to display a login screen 200 for logging in to an administrator page of a connection service through the touch point 40 (step S13). FIG. 13 is a diagram illustrating an example of the login screen displayed on the administrator terminal. A login screen 200 illustrated in FIG. 13 includes an input field 211 for inputting an administrator ID, an input field 213 for inputting a password, and a login button 215 that is pressed to perform login. In the input field 211, an e-mail address of the administrator is input as the administrator ID. In addition, the login screen 200 includes an account linkage section 220 that is selected when login is performed with an account of an external service.

Subsequently, the reception unit 72 receives the administrator ID and the password by input operations to the input fields 211 and 213 performed by the administrator (step S14). When the administrator presses the login button 215, the browser unit 71 transmits a login request to the information processing system 10 (step S15). The login request includes the administrator ID and the password input in step S14. The portal unit 11 of the information processing system 10 receives the login request transmitted from the administrator terminal 70.

Then, the authentication unit 14 of the information processing system 10 searches the administrator information management DB 1003 (see FIG. 9) using the administrator ID and the password included in the login request received in step S15 as search keys. Subsequently, the authentication unit 14 authenticates the administrator by determining whether the same pair of administrator ID and password is stored in the administrator information management DB 1003 (step S16). In the following description of the present embodiment, a case in which the authentication unit 14 determines that the administrator has a legitimate use authority is described.

Then, the portal unit 11 transmits an authentication success notification indicating that the authentication is successful to the administrator terminal 70 that is a transmission source of the login request (step S17). The browser unit 71 of the administrator terminal 70 receives the authentication success notification transmitted from the information processing system 10.

Figure 14:
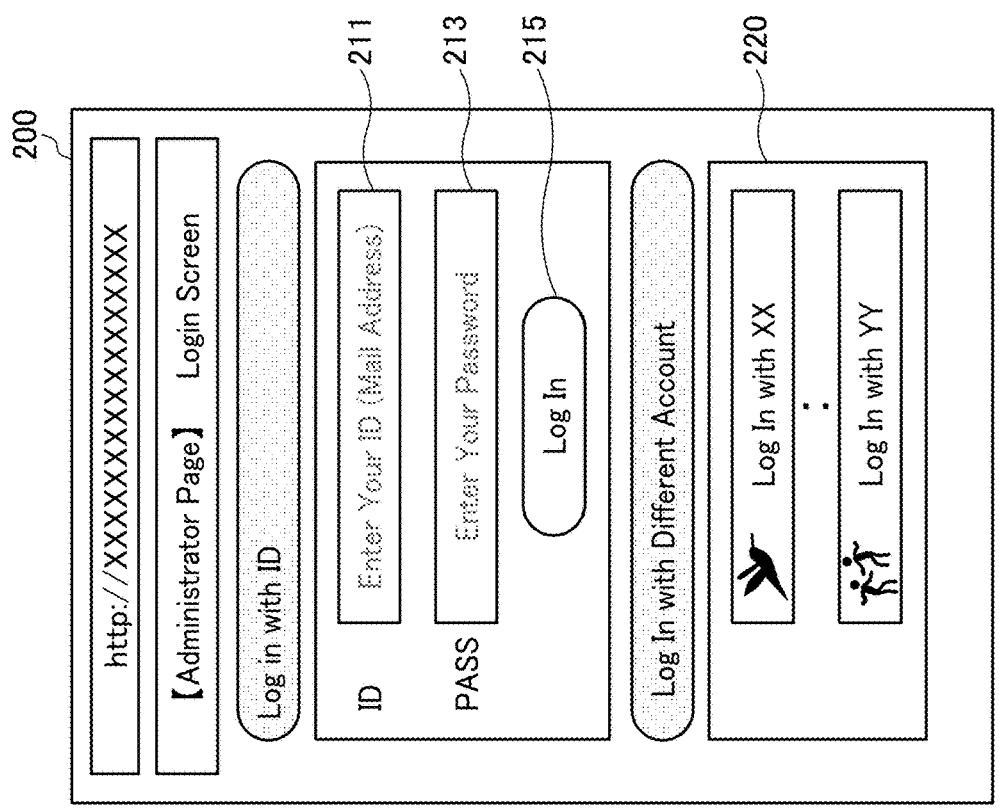
FIG. 14 is a diagram illustrating an example of a top screen displayed on the administrator terminal according to the exemplary embodiment.

Subsequently, the display control unit 73 of the administrator terminal 70 causes a display unit such as the display 718 to display a top screen 250 of the administrator page of the connection service through the touch point 40 (step S18). FIG. 14 is a diagram illustrating an example of a top screen displayed on the administrator terminal. The top screen 250 illustrated in FIG. 14 includes a system registration button 253 for registering the external system 90 to be connected and a link setting button 255 for linkage settings of the connection service through the touch point 40.

Then, the administrator terminal 70 links with a service to provide the connection service for providing the connection service through the touch point 40 (step S19). A detailed description of the processing of step S19 is given below.

Figure 15:
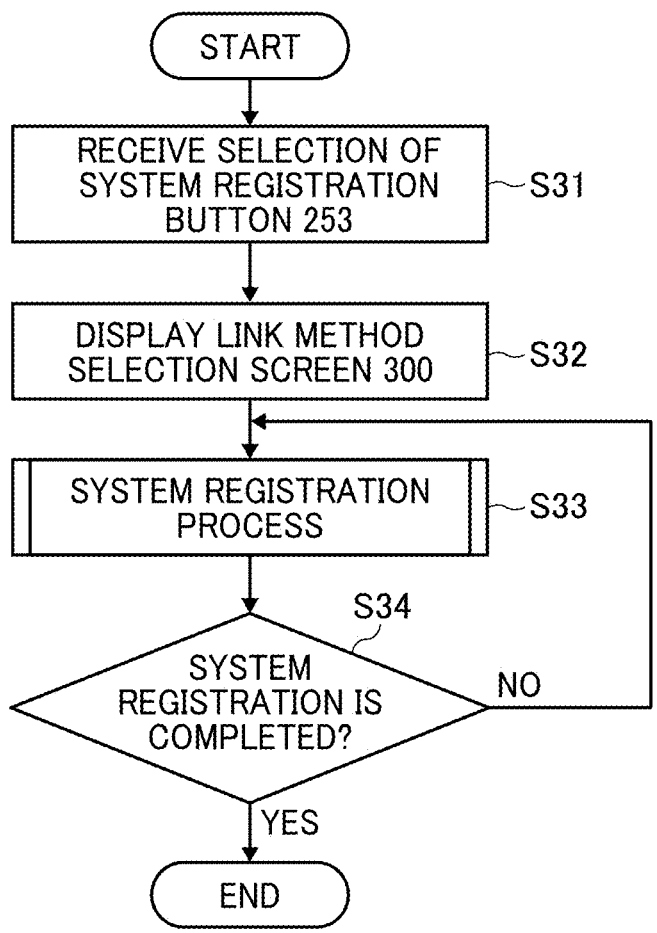
FIG. 15 is a flowchart illustrating an example of a process of registering an external system according to the exemplary embodiment.

Process of Registering System:

A process of registering the external system 9 to be linked with the information processing system 10 in advance is described with reference to FIG. 15 to FIG. 18. FIG. 15 is a flowchart illustrating an example of the process of registering an external system.

Figure 16:
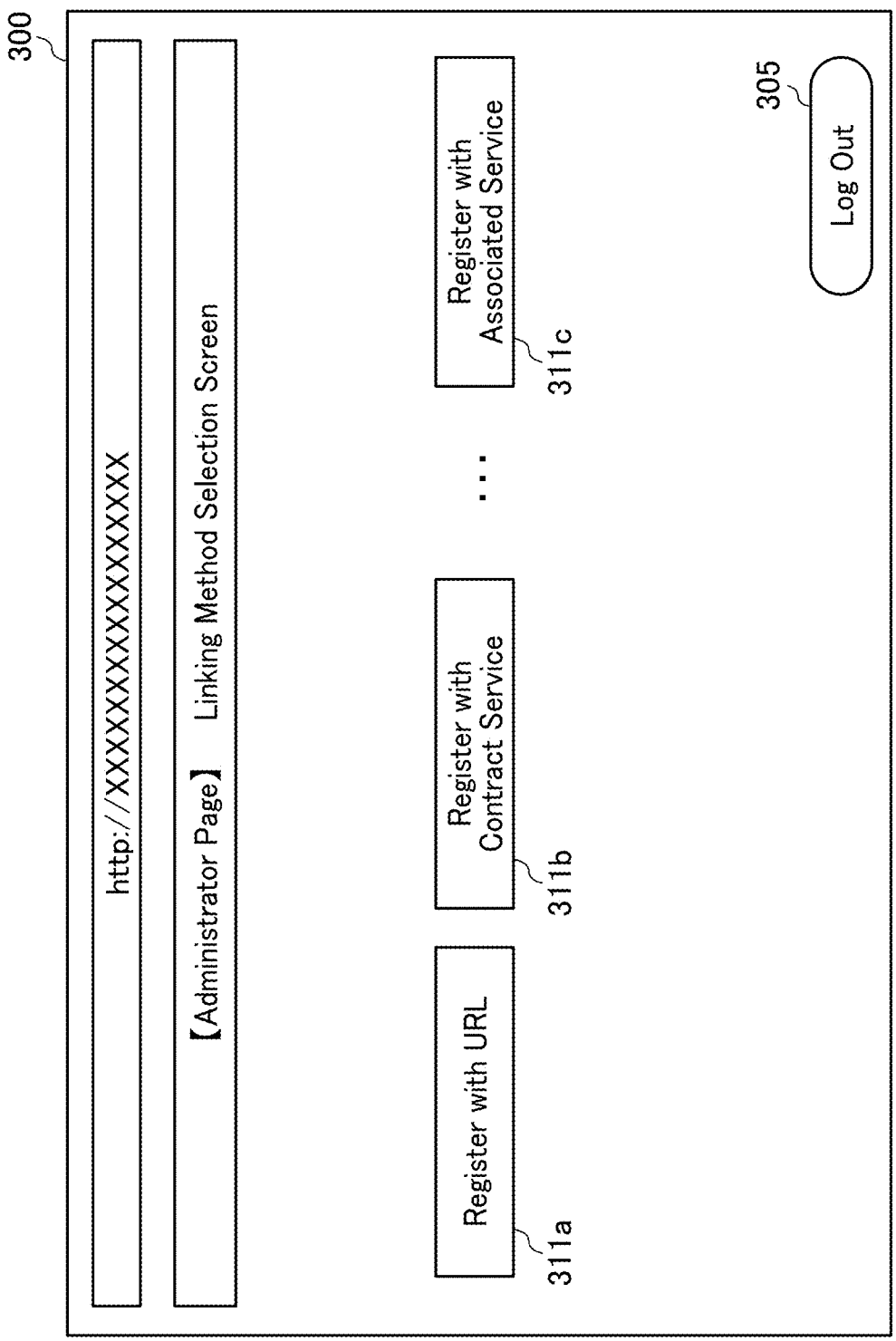
FIG. 16 is a diagram illustrating an example of a linking method selection screen according to the exemplary embodiment.

The reception unit 72 of the administrator terminal 70 receives selection of a system registration button 253 included in the top screen 250 by an input operation of the administrator (step S31). Subsequently, the display control unit 73 causes a display unit such as the display 718 to display a linking method selection screen 300 for selecting a linking method to be used for linking with the external system 90 (step S32). FIG. 16 is a diagram illustrating an example of the linking method selection screen. The linking method selection screen 300 illustrated in FIG. 16 includes linking method selection buttons 311 (311a, 312b, ...) for selecting a method of registering the external system 90 and a logout button 305 that is pressed for logging out from the administrator page.

The linking method selection button 311a is a selection button that is pressed for registering the external system 90 with a URL. The linking method selection button 311b is a selection button that is pressed for registering the external system 90 with a contract service. The linking method selection button 311b is a selection button that is pressed for registering the external system 90 with an associated service.

Figure 17:
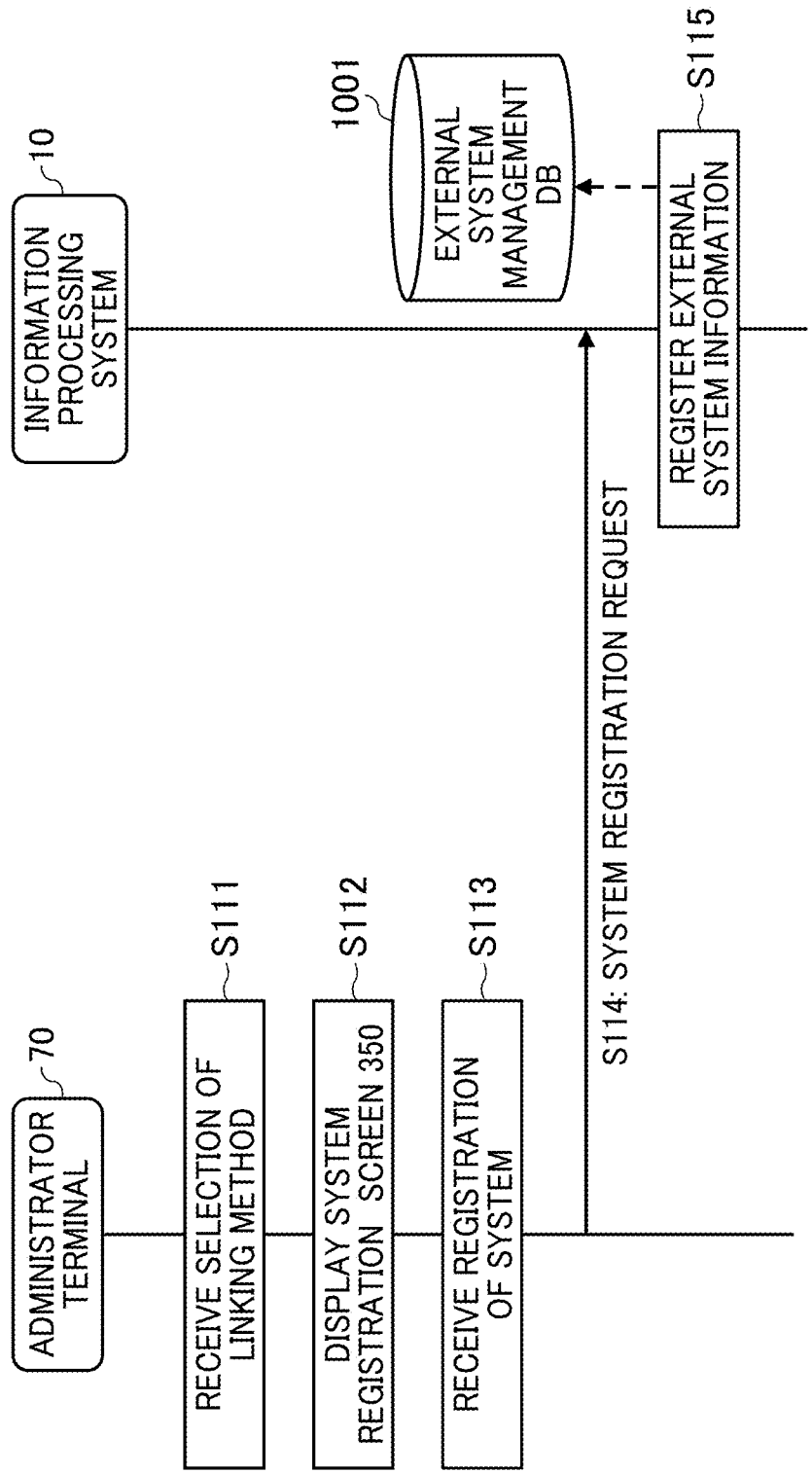
FIG. 17 is a sequence diagram illustrating an example of a process of registering a system according to the exemplary embodiment.

Subsequently, the administrator terminal 70 executes the process of registering a system that is the external system 90 to be linked (step S33). The processing of step S33 is described in detail below with reference to FIG. 17. FIG. 17 is a sequence diagram illustrating an example of the process of registering a system.

Figure 18:
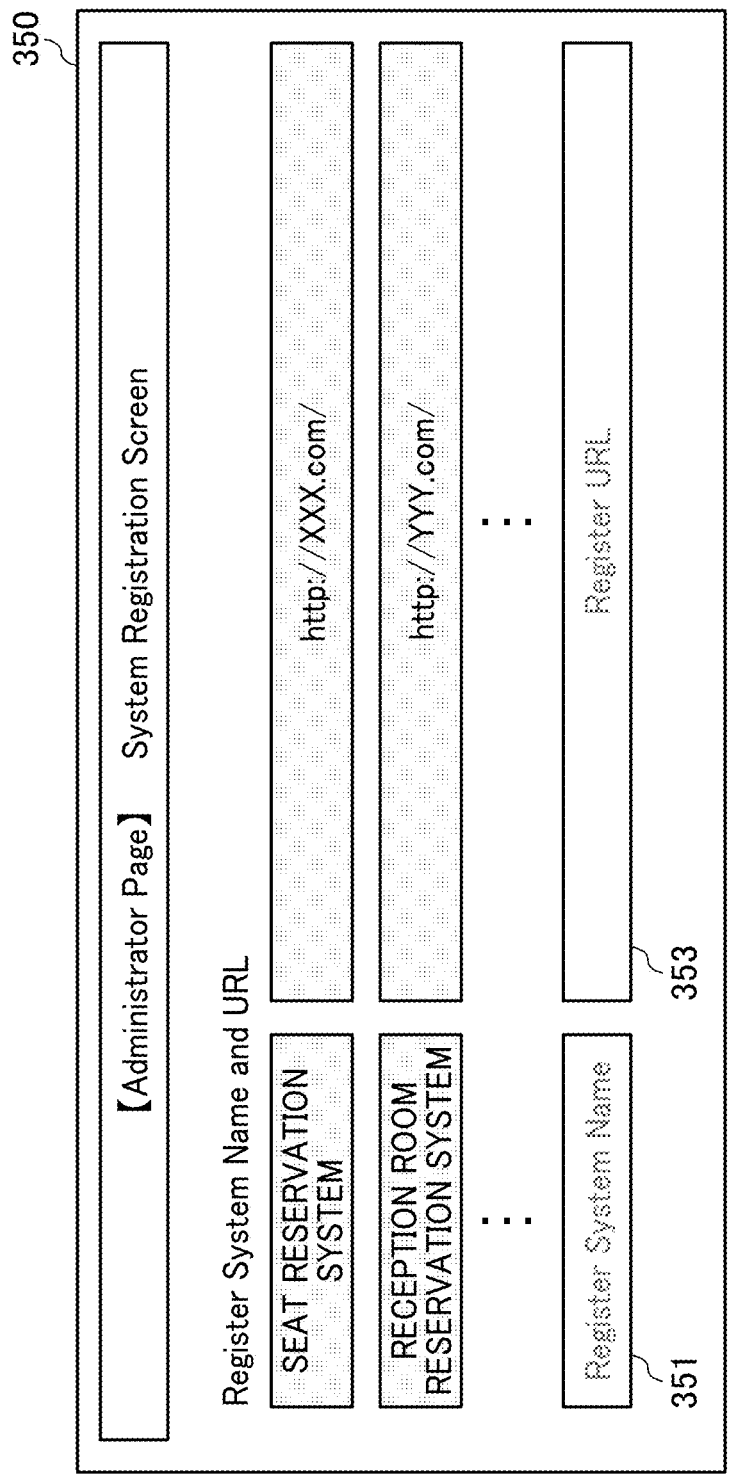
FIG. 18 is a diagram illustrating an example of a system registration screen according to the exemplary embodiment.

When the administrator presses the linking method selection button 311 included in the linking method selection screen 300, the reception unit 72 of the administrator terminal 70 receives selection of a linking method (step S111). Then, the display control unit 73 causes a display unit such as the display 718 to display a system registration screen 350 for registering the external system 90 to be linked by the linking method selected in step S111 (step S112). FIG. 18 is a diagram illustrating an example of the system registration screen. The system registration screen 350 illustrated in FIG. 18 is displayed when the administrator presses the linking method selection button 311a in step S111, and is a display screen for registering a URL as a linking method. The system registration screen 350 includes a system name registration button 351 for registering a name (system name) of the external system 90 and a connection destination registration button 353 for registering a URL that is a connection destination of each external system 90. In the example illustrated in FIG. 18, each of the seat reservation system and the reception room reservation system is registered as the external system 90, and an URL corresponding to each of the external systems 90 is registered.

Then, the reception unit 72 of the administrator terminal 70 receives registration of the external system 90 according to various input operations performed on the system registration screen 350 by the administrator (step S113). Then, the browser unit 71 transmits a system registration request to the information processing system 10 (step S114). The system registration request includes information on the system name of the external system 90 received in step S113 and information on the URL corresponding to the external system 90. The portal unit 11 of the information processing system 10 receives the system registration request transmitted from the administrator terminal 70.

Then, the registration unit 15 of the information processing system 10 registers external system information associated with the information on the system name and the information on the URL received in step S114 in the external system management DB 1001 (see FIG. 7) (step S115). At the same time, the registration unit 15 assigns a system ID for identifying the external systems 90 corresponding to the external system information to be registered.

Referring again to FIG. 15, when the registration process of the external system 90 ends in response to a predetermined input operation performed by the administrator (YES in step S34), the administrator terminal 70 ends the process and repeats the processing from step S33 until the system registration process ends (NO in step S34). As described above, for providing a service through the touch point 40, the information processing system 10 registers, in advance, the external system 90 that may be one to be linked.

Figure 19:
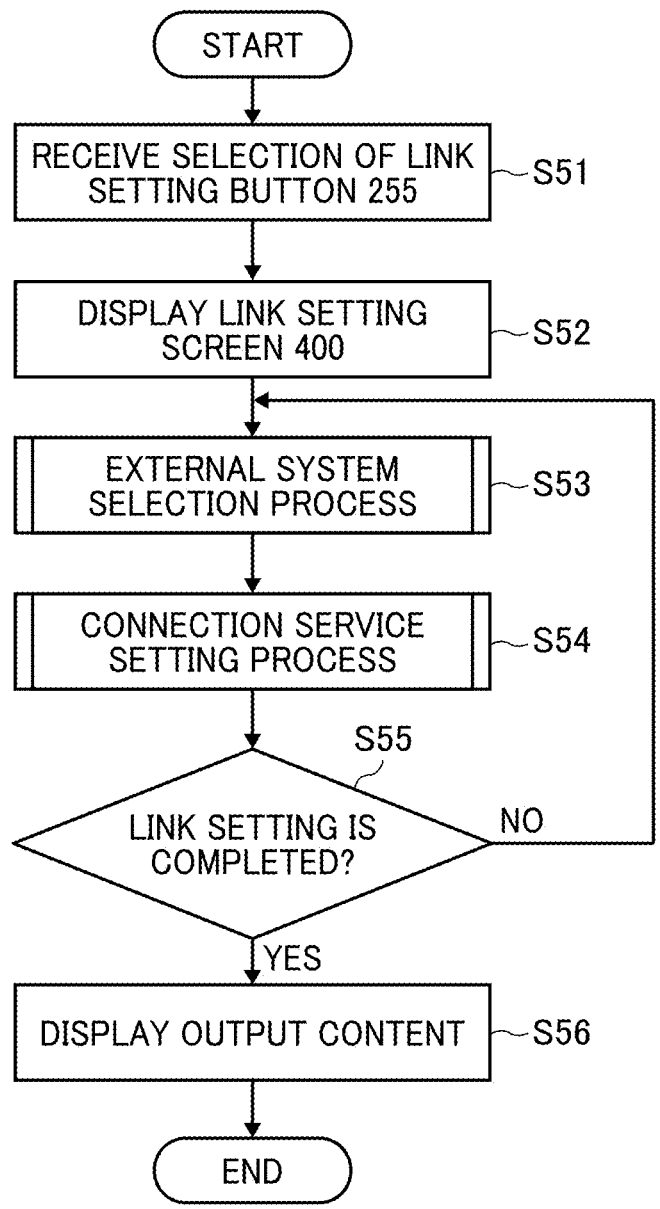
FIG. 19 is a flowchart illustrating an example of a process of setting a connection service according to the exemplary embodiment.

Process of Setting Connection Service:

A process of setting a connection service to be provided by linking with the external system 90 registered in the above-described process is described below with reference to FIG. 19 to FIG. 27. FIG. 19 is a flowchart illustrating an example of the process of setting a connection service (connection service setting process).

Figure 20:
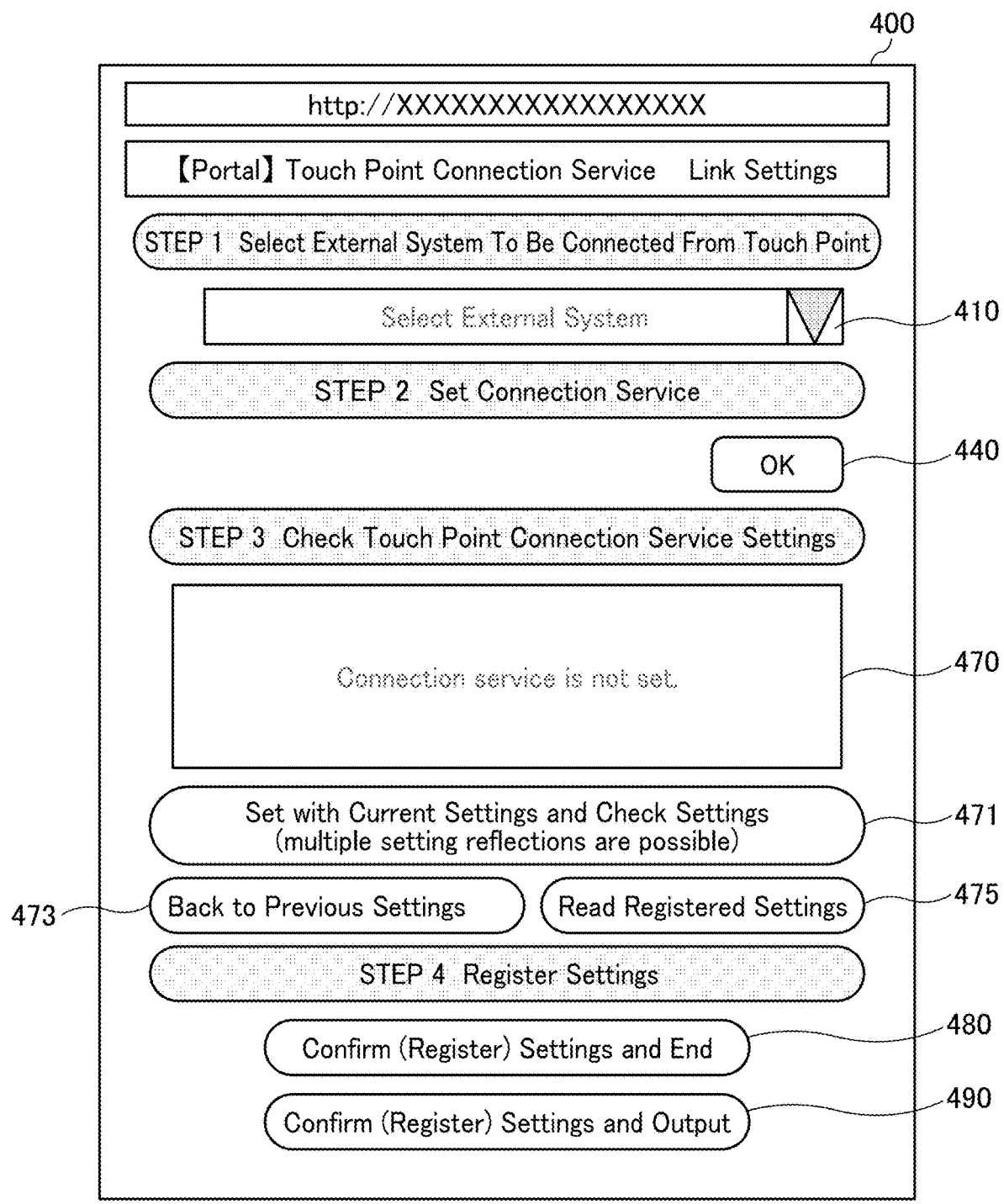
FIG. 20 is a diagram illustrating an example of a link setting screen according to the exemplary embodiment.

The reception unit 72 of the administrator terminal 70 receives selection of the link setting button 255 included in the top screen 250 by an input operation of the administrator (step S51). Subsequently, the display control unit 73 causes a display unit such as the display 718 to display a link setting screen 400 for link settings of a cooperation service (step S32). FIG. 20 is a diagram illustrating an example of the link setting screen. The link setting screen 400 illustrated in FIG. 20 includes an external system selection button 410 for selecting the external system 90 to be connected from the touch point, and a setting execution button 440 for setting a connection service to be associated. The link setting screen 400 includes a settings display area 470 for displaying details of link settings, a setting check button 471 to be pressed for displaying the settings in a setting display area 470, a return button 473 to be pressed for returning the settings to the previous state, and a setting reading button 475 to be pressed for reading the registered settings. The link setting screen 400 includes an end button 480 that is pressed for confirming the settings and ending the link setting processing, and an output button 490 that is pressed for confirming the settings and outputting the touch point 40.

Figure 21:
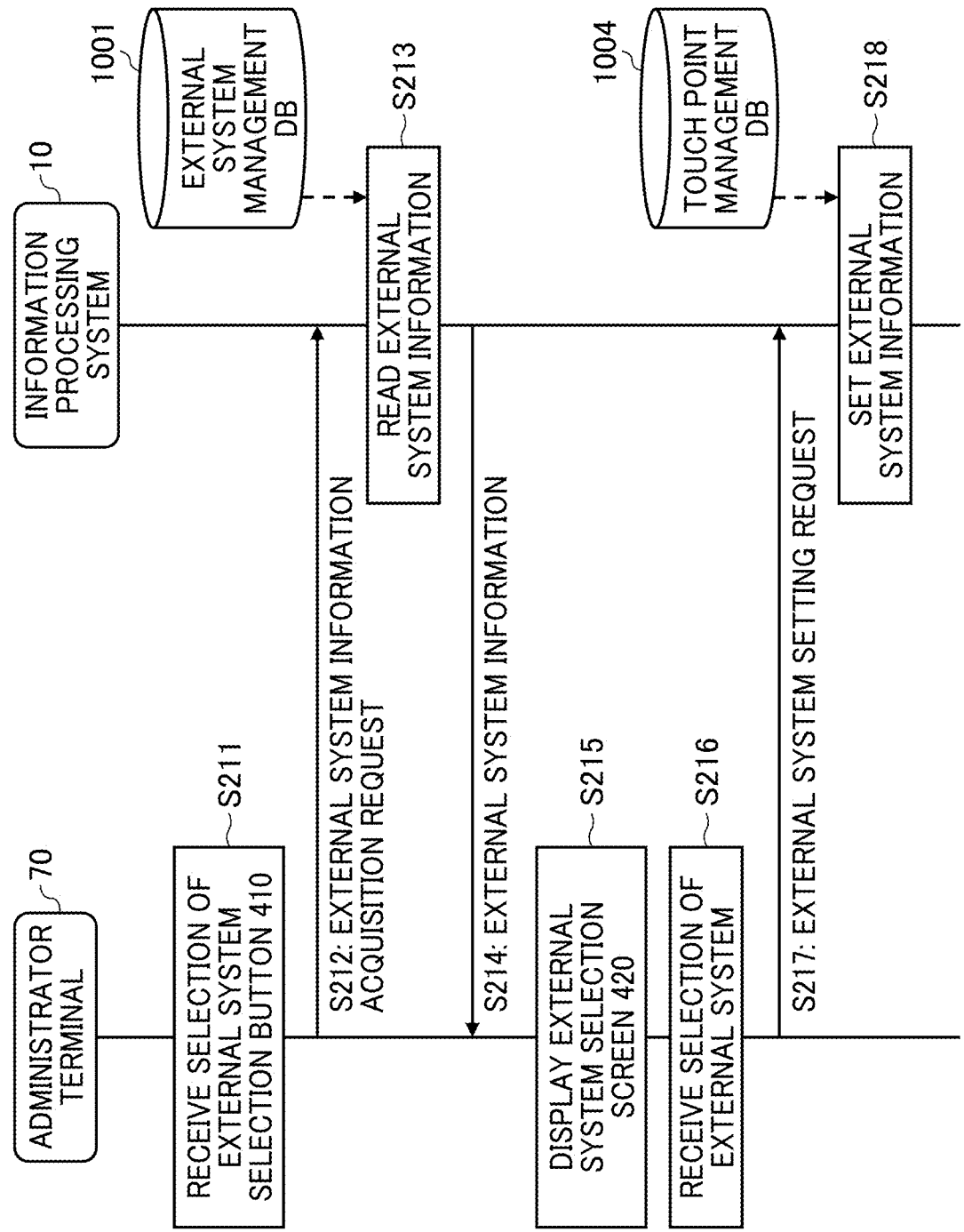
FIG. 21 is a sequence diagram illustrating an example of a process of selecting an external system according to the exemplary embodiment.

Then, the administrator terminal 70 executes a process of selecting the external system 90 to be connected from the touch point (step S53). The processing of step S53 is described in detail below with reference to FIG. 22. FIG. 21 is a sequence diagram illustrating an example of the process of selecting an external system.

The reception unit 72 of the administrator terminal 70 receives selection of the external system selection button 410 included in the link setting screen 400 by an input operation of the administrator (step S211). Then, the browser unit 71 transmits an external system information acquisition request to the information processing system 10 (step S212). The portal unit 11 of the information processing system 10 receives the external system information acquisition request transmitted from the administrator terminal 70.

The storing/reading unit 19 of the information processing system 10 reads external system information from the external system management DB 1001 (see FIG. 7) (step S213). Then, the portal unit 11 transmits the external system information read in step S213 to the administrator terminal 70 that is the request source (step S214). The browser unit 71 of the administrator terminal 70 receives the external system information transmitted from the information processing system 10.

Figure 22:
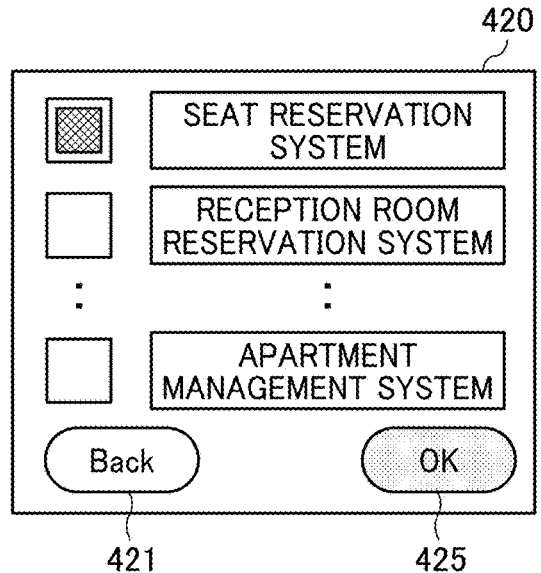
FIG. 22 is a diagram illustrating an example of an external system selection screen according to the exemplary embodiment.

Then, the display control unit 73 of the administrator terminal 70 causes a display unit such as the display 718 to display an external system selection screen 420 for selecting the external system 90 to be linked (step S215). FIG. 22 is a diagram illustrating an example of the external system selection screen. The external system selection screen 420 illustrated in FIG. 22 includes system names of each external system 90 indicated in the external system information received in step S214. Each system name is selectable on the screen. The external system selection screen 420 includes a return button 421 which is pressed for going back to the link setting screen 400, and an OK button 425 that is pressed for completing the selection of the external system 90 with which the link setting is performed.

Then, the reception unit 72 of the administrator terminal 70 receives the selection of the external system according to operations performed by the administrator of selecting a system name and pressing the OK button 425 (step S216). Then, the browser unit 71 transmits an external system setting request to the information processing system 10 (step S217). The external system setting request includes information on the external system selected in step S216. In a case of the example illustrated in FIG. 22, the external system setting request includes information on the seat reservation system that is a selected external system. The portal unit 11 of the information processing system 10 receives the external system information acquisition request transmitted from the administrator terminal 70.

Then, the setting unit 16 of the information processing system 10 sets the external system information (for example, system ID) in the touch point management DB 1004 in response to the setting request received in step S217 (step 218).

Figure 23:
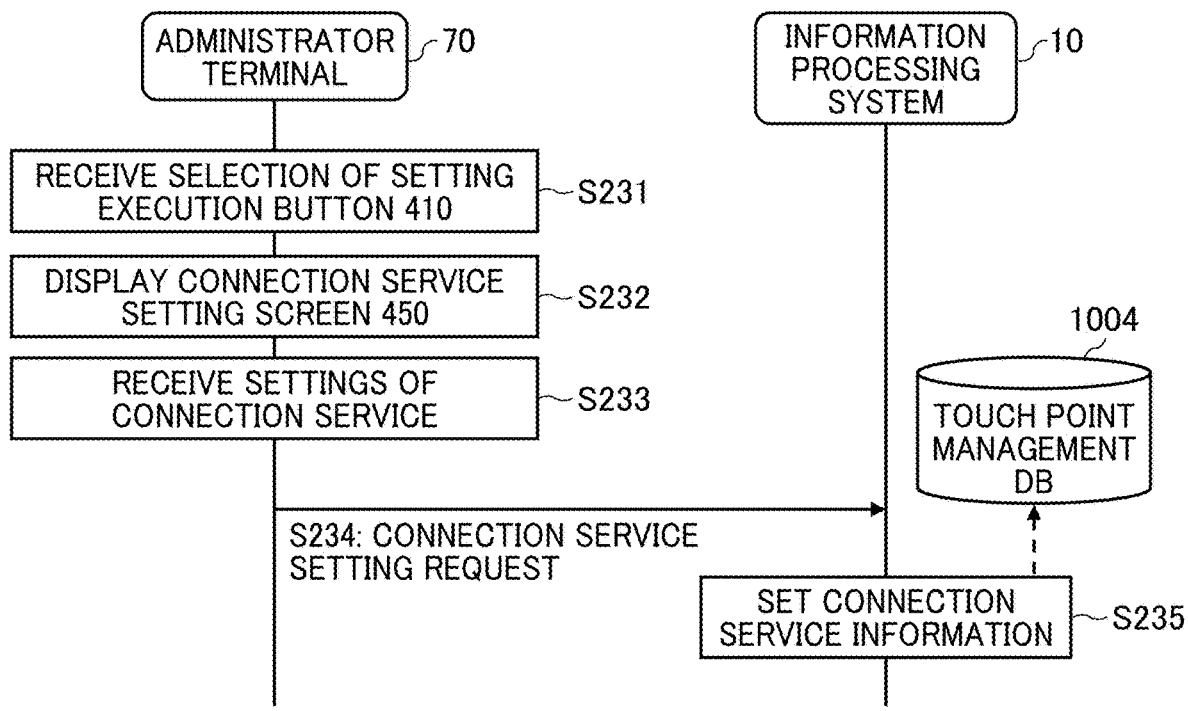
FIG. 23 is a sequence diagram illustrating an example of setting a connection service according to the exemplary embodiment.

Referring again to FIG. 19, the administrator terminal 70 executes a setting process for a connection service to be provided by linking with the external system 90 set in step S53 (step S54). The processing of step S54 is described in detail below with reference to FIG. 23. FIG. 23 is a sequence diagram illustrating an example of the connection service setting process.

Figure 24:
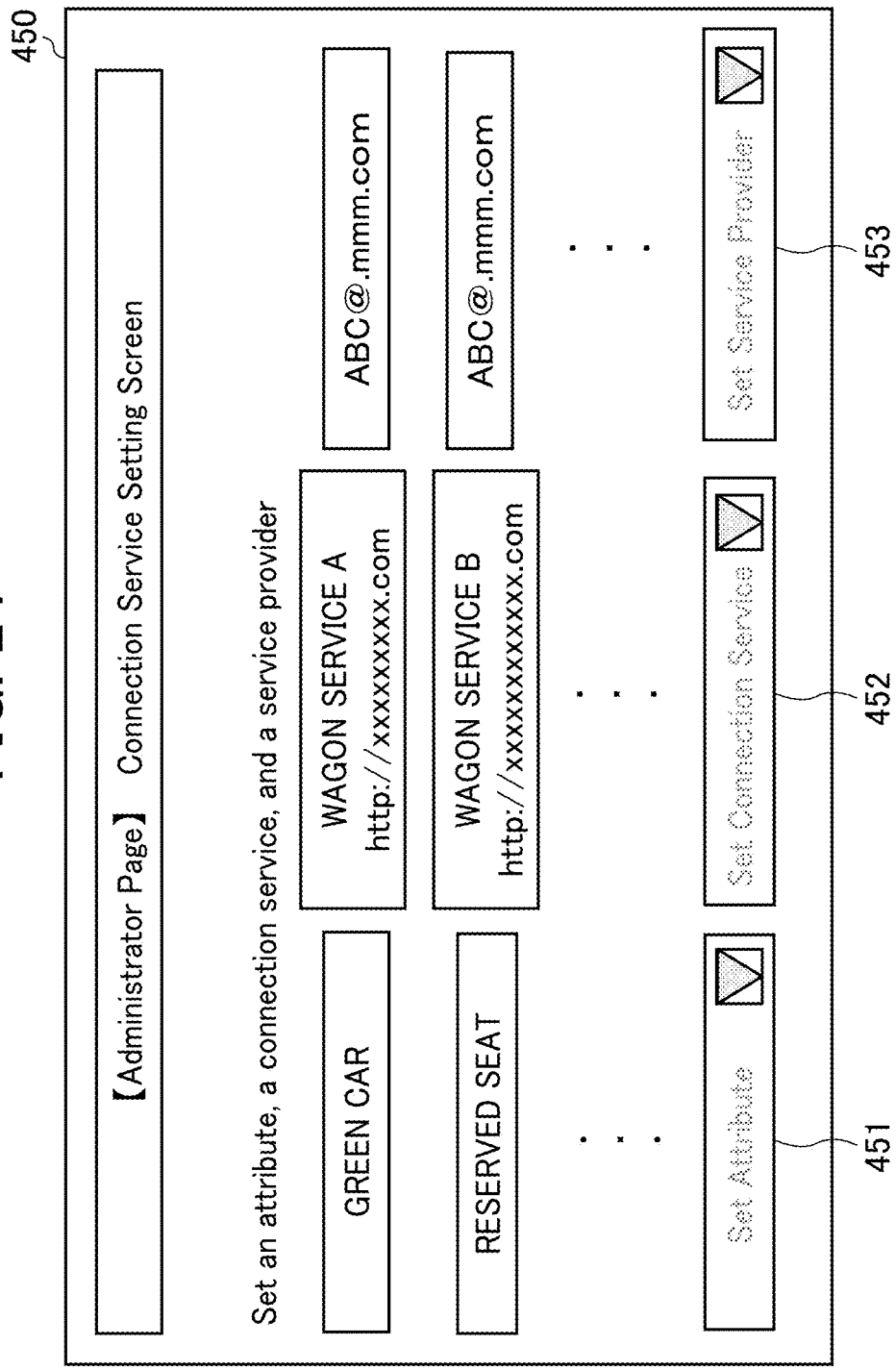
FIG. 24 is a diagram illustrating an example of a connection service setting screen according to the exemplary embodiment.

The reception unit 72 of the administrator terminal 70 receives selection of the setting execution button 440 included in the link setting screen 400 by an input operation of the administrator (step S231). Then, the display control unit 73 of the administrator terminal 70 causes a display unit such as the display 718 to display a connection service setting screen 450 for setting a connection service to be provided by linking with the external system 90 set in step S53 (step S232). FIG. 24 is a diagram illustrating an example of the connection service setting screen. The connection service setting screen 450 illustrated in FIG. 24 is a display screen that is displayed when the administrator presses the setting execution button 440 in step S231 and on which a connection service is set for each attribute. The connection service setting screen 450 includes an attribute setting button 451 for setting an attribute for identifying a set location of the touch point 40, a connection service setting button 452 for setting a connection service for each attribute, and a service provider setting button 453 for setting a service provider.

The administrator inputs or selects an attribute for identifying the set location of the touch point 40 by selecting the attribute setting button 451. Then, the administrator inputs or selects a connection service name and a connection destination associated with the set attribute by selecting the connection service setting button 452. Then, the administrator inputs or selects account information of a service provider that provides a service corresponding to the set attribute and the set connection service by selecting the service provider setting button 453. The administrator repeatedly performs the link setting for each combination of an attribute, a connection service, and a service provider.

The reception unit 72 of the administrator terminal 70 receives the settings of the connection service to be provided by linking with the external system 90 according to various input operations performed by the administrator on the connection service setting screen 450 (step S233). Then, the browser unit 71 transmits a connection service setting request to the information processing system 10 (step S234). The connection service setting request includes the attribute information, the connection service information, and the provider information received in step S233. The portal unit 11 of the information processing system receives the connection service setting request transmitted from the administrator terminal 70.

Then, the setting unit 16 of the information processing system 10 sets the combination of the attribute information, the connection service information, and the provider information received in step S218 in association with the external system information set in step S234 in the touch point management DB 1004 (see FIG. 10) (step 235). Setting each combination of attribute information, connection service information, and provider information as described above allows the information processing system 10 to access a corresponding connection service according to the set location (attribute) of the touch point 40, even when the same touch point 40 is read.

Referring again to FIG. 19, when the link setting is ended in response to an operation performed by the administrator of selecting the end button 480 or the output button 490 (YES in step S55), the administrator terminal 70 shifts the processing to step S56 and repeats the processing from step S53 until the link setting is ended (NO in step S55).

Figure 25:
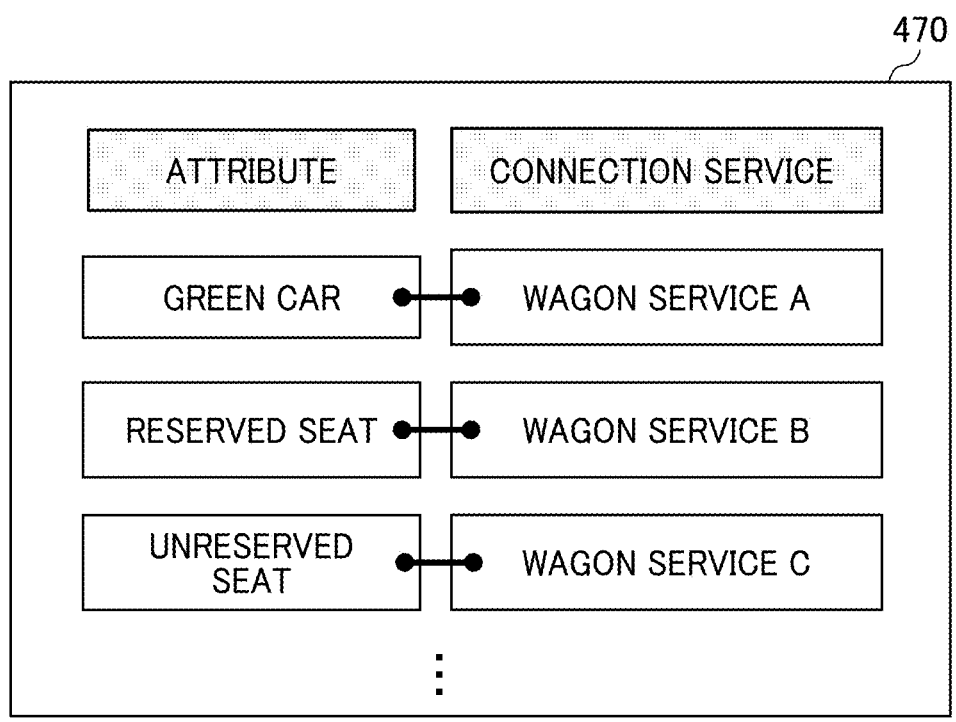
FIG. 25 is a diagram illustrating an example of settings displayed in a setting display area according to the exemplary embodiment.

FIG. 25 is a diagram illustrating an example of settings displayed in the setting display area. The setting display area 470 illustrated in FIG. 25 is displayed on the link setting screen 400 when the administrator selects the setting check button 471. In the example of the setting display area 470 illustrated in FIG. 25, a combination of an attribute and a connection service is corresponding to one set in the processing of step S54 in FIG. 19. As illustrated in FIG. 25, the connection service of "WAGON SERVICE A" is associated with the attribute "GREEN CAR". In addition, the connection service of "WAGON SERVICE B" is associated with the attribute "RESERVED SEAT." In addition, the connection service of "WAGON SERVICE C" is associated with the attribute "UNRESERVED SEAT." The settings displayed in the setting display area 470 are set as information associated with the same touch point ID in the touch point management DB 1004 in the above-described processing.

Figures 26, 27:
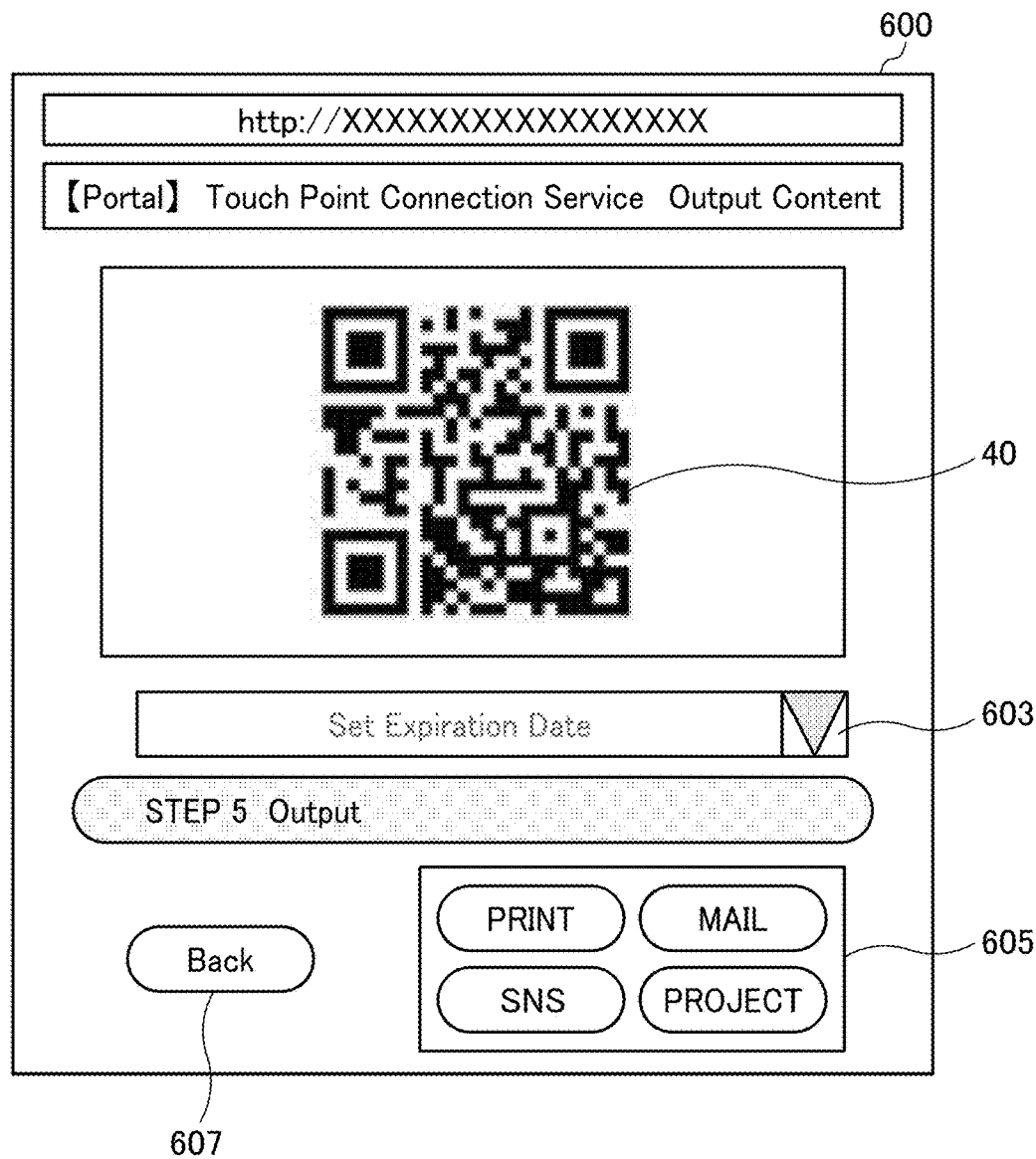
FIG. 26 is a diagram illustrating an example of an output content display screen according to the exemplary embodiment.
FIG. 27 is a diagram illustrating an example of touch point information according to the exemplary embodiment.

Then, when the administrator selects the output button 490 to end the link setting, the display control unit 73 of the administrator terminal 70 causes a display unit such as the display 718 to display an output content display screen 600 for displaying output content of the link setting (step S56). FIG. 26 is a diagram illustrating an example of the output content display screen. The output content display screen 600 illustrate in FIG. 26 includes an image indicating the touch point 40, an expiration date setting button 603 for setting an expiration date of the touch point 40, an output method selection button 605 for selecting an output method of the touch point 40, and a return button 607 to be pressed for going back to the link setting screen 400.

The image indicating the touch point 40 included in the output content display screen 600 of FIG. 26 is an image serving as an output result in which the touch point information created by the generating unit 17 is output by the output unit 18. The image indicating the touch point 40 is a QR code (registered trademark). Note that the image indicating the touch point 40 is not limited to the QR code, and may be a two-dimensional code such as DataMatrix (Data-Code), MaxiCode, or PDF417. The touch point 40 is set at a predetermined position in the user environment according to operations performed by the administrator for outputting the image indicating the touch point 40 by a method selected by the output method selection button 605. For example, the administrator prints out the image indicating the touch point 40 and attaches the image indicating the touch point on a desired position in the user environment, and the user reads the image indicating the touch point 40, accordingly.

Note that the touch point 40 is not limited to the image such as the two-dimensional code as described above. The touch point 40 may be a touch point using short-range communication by an NFC tag or an RFID tag, for example. The touch point 40 may be a touch point using near field communication such as Bluetooth or ultrasonic waves, for example. The output content display screen 600 illustrated in FIG. 26 is an example of a case where the touch point 40 is an image. When the touch point 40 has a form other than an image, a user interface (UI) screen corresponding to the form of the touch point 40 is displayed.

FIG. 27 is a diagram illustrating an example of the touch point information. The touch point information illustrated in FIG. 27 is, for example, information acquired when the user reads the touch point 40 using the user terminal 50. The touch point information includes a touch point ID for identifying the touch point 40 and access information indicating an access destination to be accessed by the user terminal 50 when the touch point 40 is read. This access information is a URL to be accessed with the user terminal 50 that has read the touch point 40, and corresponds to the portal unit 11 of the information processing system 10.

As described above, the information processing system 10 sets, for each set position of the touch point 40, a connection service to be accessed by a user and information on a service provider, in providing, through the touch point 40 that does not depend on a set position, a service. In addition, the information processing system 10 dynamically changes the service to be provided to the user through the touch point 40 without replacing the touch point 40 that is previously set, by changing a setting of the combination of the attribute information, the connection service information, and the provider information.

Process for Using Service:

Example of Linking with Seat Reservation System

A process for using a service provided through the touch point is described below with reference to FIG. 28 to FIG. 43. In the following description of the process for using a service, a case in which the user uses a predetermined service by reading with the user terminal 50 the touch point 40 set with the information processing system 10 by the above-described processing is described.

Figure 28:
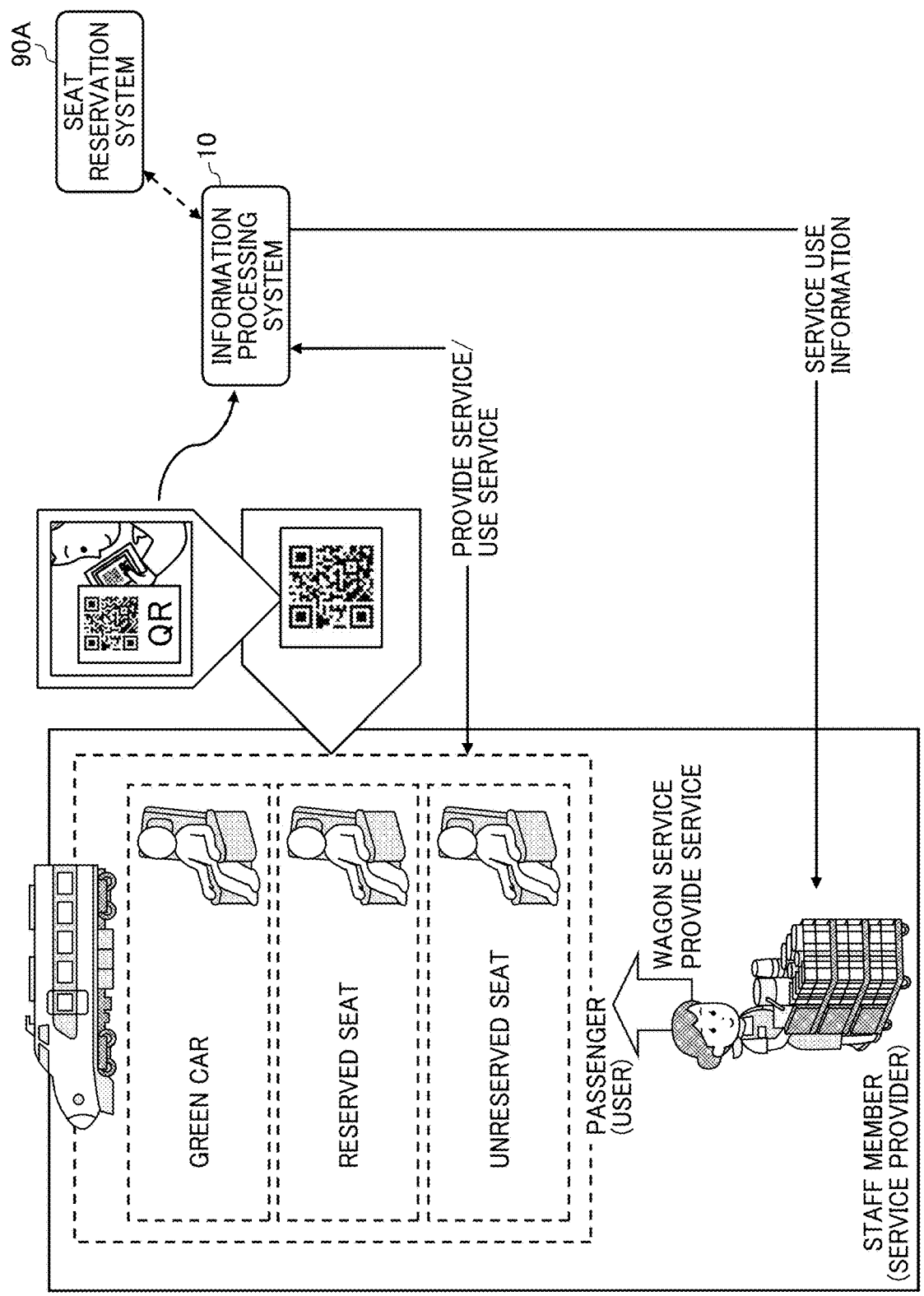
FIG. 28 is a schematic diagram illustrating an example of a service provided by linking with a seat reservation system according to the exemplary embodiment.
Figure 32A:
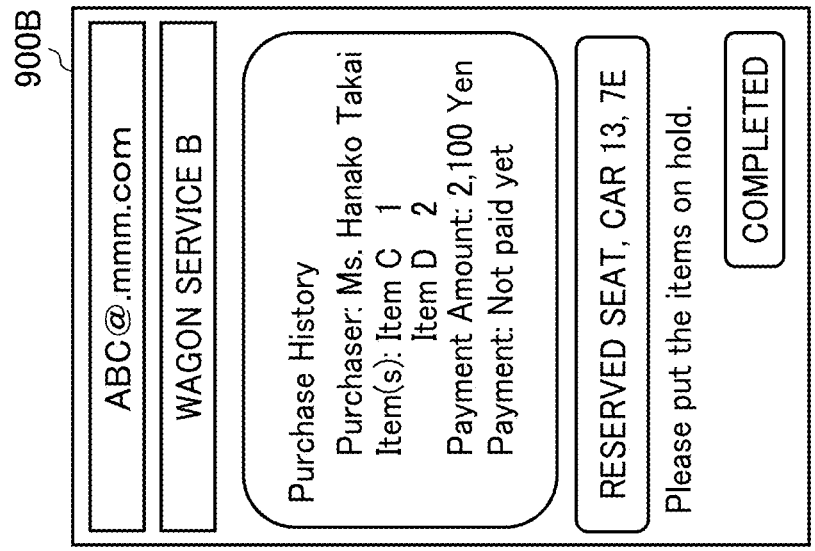
FIG. 32A and FIG. 32B are diagrams each illustrating an example of a service provider screen displayed on the provider terminal according to the exemplary embodiment.
Figure 32B:
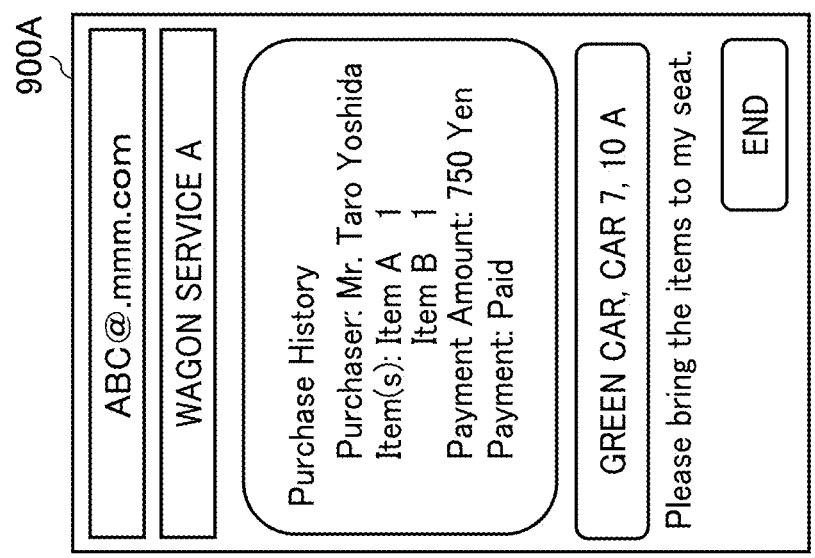

A process for using a connection service provided by system linkage (system integration) between a seat reservation system as an example of the external system and the information processing system 10 is described below with reference to FIG. 28 to FIG. 32 (FIG. 32A and FIG. 32B). FIG. 28 is a schematic diagram illustrating an example of a service provided by linking with the seat reservation system.

In the example illustrated in FIG. 28, an image (for example, QR code) indicating the touch point 40 corresponding to the seat reservation system (system ID: S001), which is an example of the external system 90 is attached to each seat of a bullet train, and a service provided by the service provider that is, for example, a staff member working on the bullet train is to be available by reading the touch point 40 at the seat reserved by a user who is a passenger of the bullet train.

The same touch point 40 is set at, attached on, each of the seats including the seats in a green car, the reserved seats, and the unreserved seats, in the bullet train. When the touch point 40 set at, or attached on, the seat reserved by the user (passenger) is read, the user terminal 50 transmits the touch point information including the read touch point ID and account information of the user to the information processing system 10.

The information processing system 10 refers to seat reservation history of the user by linking with the seat reservation system 90A, and transmits connection destination information indicating a connection destination of the connection service corresponding to a type (attribute) of the seat reserved by the user to the user terminal 50. Then, the user uses the user terminal 50 to access the corresponding connection service based on the connection destination information transmitted from the information processing system 10, and uses the service.

In addition, the information processing system 10 transmits service use information indicating the use history of each service of the connection service corresponding to the user to the provider terminal 80 used by the service provider who is a staff member. Then, the service provider checks the user who has used the service, the seat position of the user, and the service use information by browsing the provider terminal 80, and provides a wagon service to the user who sits on the reserved seat.

Figure 29:
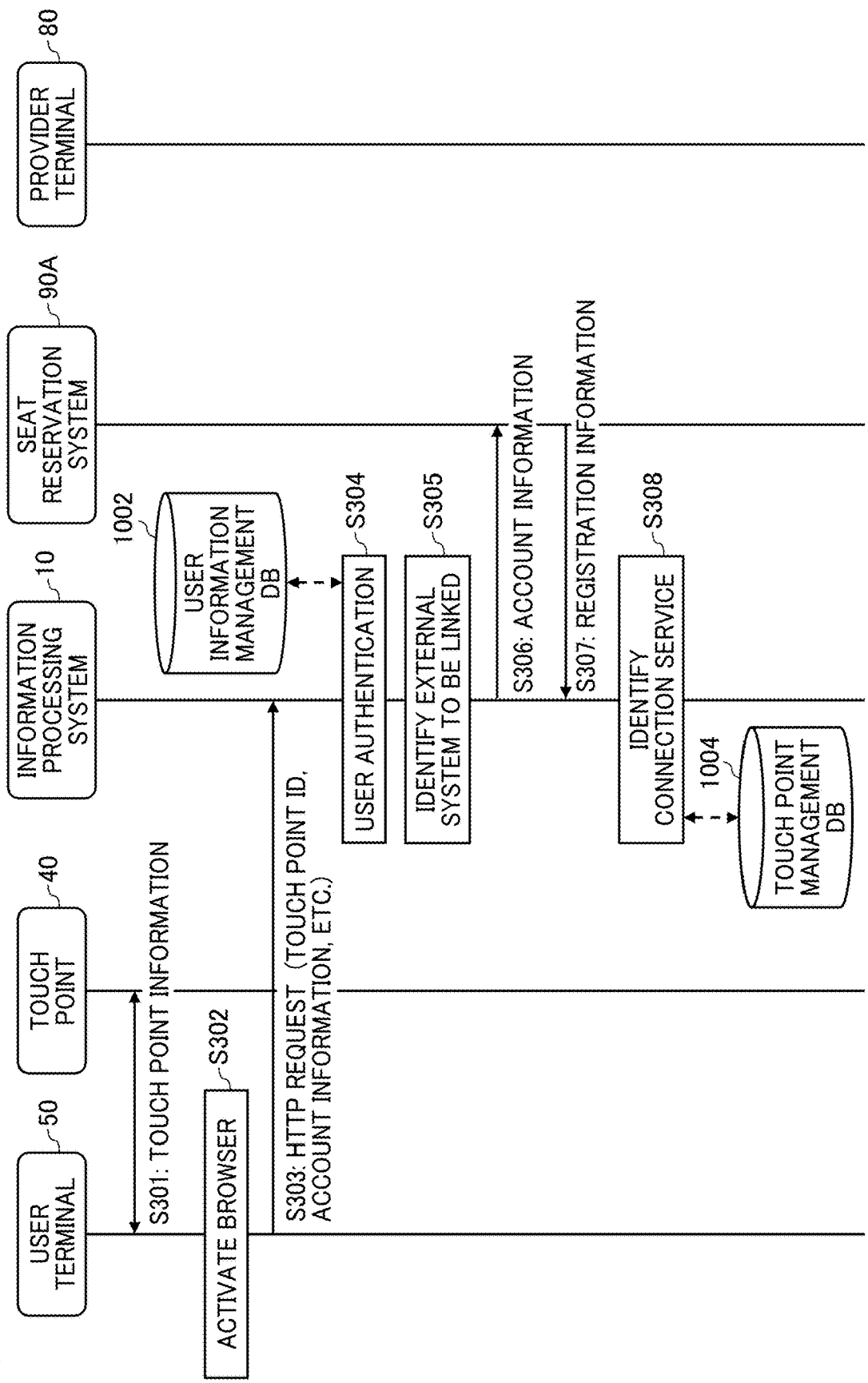
FIG. 29 is a sequence diagram illustrating an example of a process for using a service provided by linking with the seat reservation system according to the exemplary embodiment.
Figure 30:
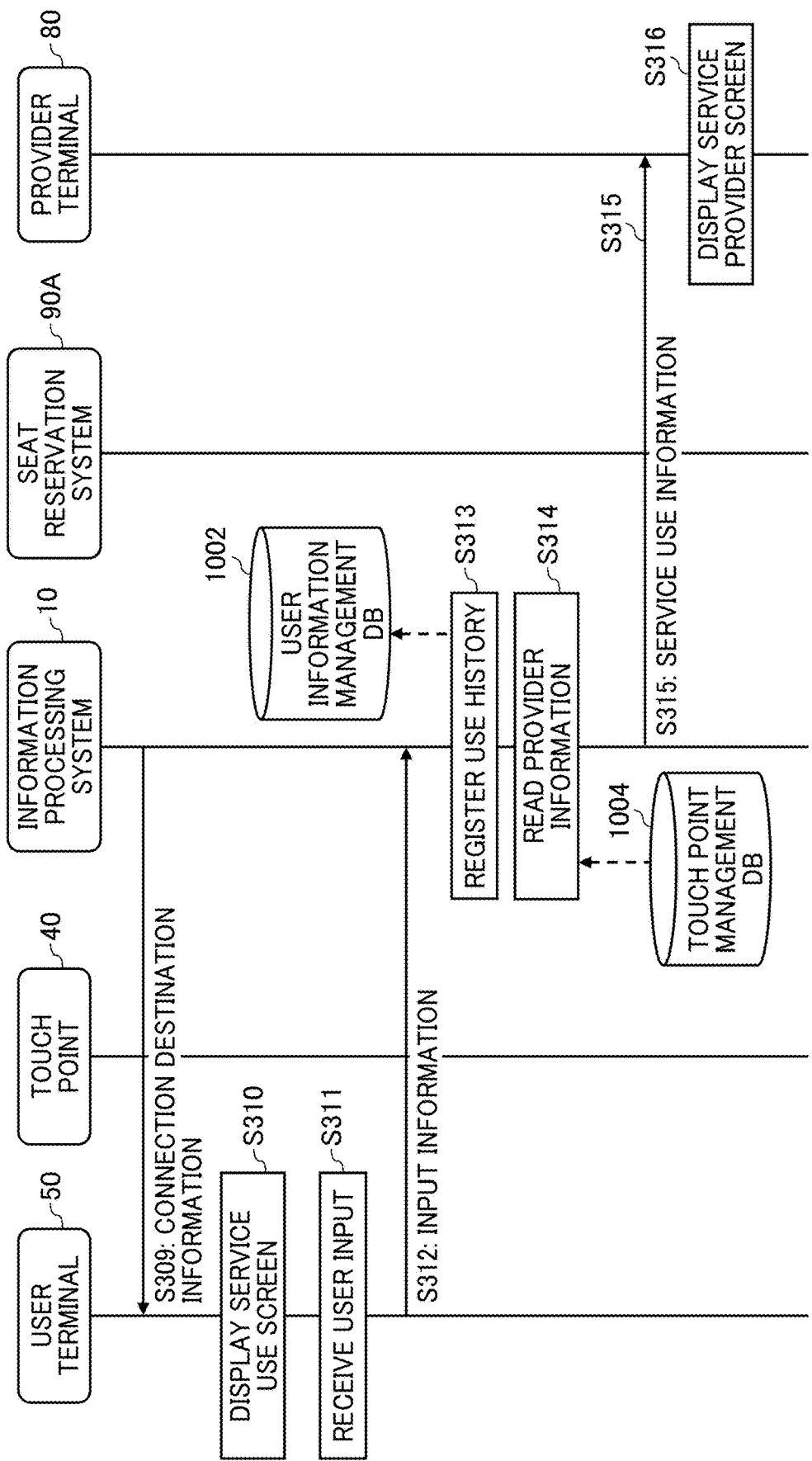
FIG. 30 is a sequence diagram illustrating an example of a process for using a service provided by linking with the seat reservation system according to the exemplary embodiment.

FIG. 29 and FIG. 30 are sequence diagrams illustrating an example of a process for using a service provided by linking with the seat reservation system. In the examples of FIG. 29 and FIG. 30, the service is provided by reading the touch point 40 set at, or attached on, the seat of the bullet train with the user terminal 50 as illustrated in FIG. 28.

The user hangs the user terminal 50 close to the touch point 40 set at, or attached on, the seat of the reserved seat of the bullet train, and takes photo of the touch point 40 using the user terminal 50, thereby an image representing the touch point 40 is captured. Then, the touch point reading unit 52 of the user terminal 50 acquires touch point information by decoding the captured image representing the touch point 40 (step S301). The touch point information includes, as illustrated in FIG. 27, a touch point ID for identifying the touch point and access information indicating an access destination to be accessed by the user terminal 50 when the touch point 40 is read. The touch point information acquired in step S301 is an example of read information.

Then, the touch point reading unit 52 of the user terminal 50 automatically activates the browser unit 51 by inputting the access information included in the touch point information acquired in step S301 (step S302). Then, the browser unit 51 of the user terminal 50 transmits a Hyper Text Transfer Protocol (HTTP) request to the access destination (information processing system 10) indicated by the access information acquired in step S301 (step S303). This HTTP request includes, for example, the touch point ID included in the touch point information acquired in step S301, the account information for identifying the user. The account information is, for example, a cookie stored in association with the access information in the user terminal 50 in the past when the user terminal 50 accesses the access destination. The account information may be input by the user when the touch point 40 is read. The portal unit 11 of the information processing system 10 that is the access destination receives the HTTP request transmitted from the user terminal 50.

Then, the authentication unit 14 of the information processing system 10 searches the user information management DB 1002 (see FIG. 8) using the user account information (user ID and password) received in step S303 as a search key. Subsequently, the authentication unit 14 authenticates the user by determining whether the same pair of user ID and password is managed in the user information management DB 1002 (step S304). In the following description of the present embodiment, a case in which the authentication unit 14 determines that the user has a legitimate use authority is described.

Then, the identifying unit 21 identifies the external system 90 to be linked by using the touch point ID received in step S303 (step S305). More specifically, the storing/reading unit 19 searches the touch point management DB 1004 (see FIG. 10) using the touch point ID received in step S303 as a search key to read and acquire a system ID associated with a touch point ID that is the same as the one received. Then, the identifying unit 21 searches the external system management DB 1001 (see FIG. 7) using the read system ID as a search key to read external system information including the same system ID as the read system ID, thereby identifying the external system 90 to be linked.

Then, the external system link unit 13 transmits the account information received in step S305 to the URL corresponding to the external system 90 identified in step S303 (in this case, the URL of the seat reservation system 90A) (step S306). Then, the seat reservation system 90A performs user authentication using the account information transmitted from the information processing system 10, and transmits registration information associated with the authenticated user to the information processing system 10 that is the request source (step S307). More specifically, the seat reservation system 90A reads the registration information associated with the authenticated user from the registration information, which is stored (see FIG. 11), and transmits to the information processing system 10 the registration information, which is read. The external system link unit 13 of the information processing system 10 receives the registration information transmitted from the seat reservation system 90A.

Then, the identifying unit 21 of the information processing system 10 identifies a connection service based on the touch point ID received in step S303 and an attribute ID included in the registration information received in step S307 (step S308). More specifically, the identifying unit 21 searches the touch point management DB 1004 (see FIG. 10) using the received touch point ID and the registration information as search keys to identify attribute information associated with the touch point ID and attribute ID, which are received. Then, the identifying unit 21 identifies connection service information associated with the identified attribute information as a connection service.

Referring to FIG. 30, then, the service unit 12 transmits the connection destination information corresponding to the connection service identified in step S308 to the user terminal 50 that is the request source (step S309). Then, the browser unit 51 of the user terminal 50 starts using a service by accessing a connection destination indicated by the connection destination information transmitted from the information processing system 10. The display control unit 54 of the user terminal 50 causes a display unit such as the display 518 display to a service use screen implemented in response to the browser unit 51 accessing the corresponding connection destination (step S310).

The service use screen displayed on the user terminal 50 allows the user to use the connection service provided from the information processing system 10. The service use screen for each connection service corresponding to an attribute is described below with reference to FIG. 31A, FIG. 31B, and FIG. 31C. FIG. 31A, FIG. 31B, and FIG. 31C are diagrams each illustrating an example of the service use screen displayed on the user terminal.

FIG. 31A is a service use screen 600A displayed on the user terminal 50 of the user who uses a seat in a green car. The service use screen 600A is displayed on the user terminal 50 used by the user who uses the seat in the green car by accessing the connection service corresponding to a wagon service A. The service use screen 600A allows the user to purchase an item by selecting the item and a payment method and pressing a purchase button, and the item purchased by the user is delivered to the seat of the user by a staff member.

FIG. 31B is a service use screen 600B displayed on the user terminal 50 of the user who uses a reserved seat. The service use screen 600B is displayed on the user terminal 50 used by the user who uses the reserved seat by accessing the connection service corresponding to a wagon service B. The service use screen 600B allows the user to purchase an item by selecting the item and a payment method and pressing a purchase button, and the user goes to a store in a car to pick up the item at the store.

FIG. 31C is a service use screen 600C displayed on the user terminal 50 of the user who uses an unreserved seat. The service use screen 600C is displayed on the user terminal 50 used by the user who uses the unreserved seat by accessing the connection service corresponding to a wagon service C. Unlike the service use screens illustrated in FIGS. 31A and 31B are displayed, the service use screen 600C does not allow the user to purchase an item from the seat, but to check w % here a store is, and this allows the user to go to the store to purchase an item when the user desires.

As described above, the information processing system 10 allows each user to access the corresponding connection destination according to the seat on which the touch point 40 read by the user is set, thereby allowing each user to use the service according to the corresponding seat on which the touch point 40 read by the user is set. In the following, a case in which one of the service use screen of the wagon service A illustrated in FIG. 31A and the service use screen of the wagon service B illustrated in FIG. 31B is displayed on the user terminal 50 is described.

In addition, with the service use screen as illustrated in FIG. 31A to FIG. 31C, an item may be recommended to the user or the records of purchases, or orders, of the user may be automatically or optionally displayed, based on the information of the service use history of the user stored in the user information management DB 1002 (see FIG. 8). In such a case, the service unit 12 of the information processing system 10 transmits the information of the service use history of the user read from the user information management DB 1002 to the user terminal 50 in the processing of step 309.

Subsequently, the reception unit 53 of the user terminal 50 receives a user input to the service use screen (step S311). Then, the browser unit 51 transmits the input information input in step S311 to the information processing system 10 (step S312). The service unit 12 of the information processing system 10 receives the input information transmitted from the user terminal 50.

Subsequently, the registration unit 15 of the information processing system 10 registers the input information received in step S312 as the service use history corresponding to the user (step S313). More specifically, the registration unit 15 registers the input information received in step S303 in the user information management DB 1002 (see FIG. 8) as the information of use history corresponding to the account information received in step S312.

Subsequently, the storing/reading unit 19 searches the touch point management DB 1004 using the touch point ID received in step S303 and the attribute information and the connection service information identified in step S308 as search keys to read the provider information associated with the received touch point ID and the specified combination of attribute information and connection service information (step S314).

Subsequently, the service unit 12 transmits the service use information with respect to the account information of the service provider indicated in the provider information read in step S314 (step S315). The service use information includes the input information received in step S312, information used to identify a user who uses the service (for example, the account information received in step S303), and information indicating a seat position of the user (for example, the seat information included in the registration information received in step S307). The browser unit 81 of the provider terminal 80 used by the service provider receives the service use information transmitted from the information processing system 10.

The display control unit 83 of the provider terminal 80 causes a display unit such as the display 518 to display a service provider screen implemented by the browser unit 81 (step S316). The service use information received in step S315 is displayed on the service provider screen. The service provider checks the information indicating the seat position of the user and the information on purchasing indicated on the service provider screen displayed on the provider terminal 80 and then provides the corresponding wagon service to the user. The service provider screen indicating service use information of a user who are using the connection service corresponding to each attribute is described below with reference to FIG. 32A and FIG. 32B. FIG. 32A and FIG. 32B are diagrams each illustrating an example of the service provider screen displayed on the provider terminal.

FIG. 32A is a service provider screen 900A on which the service use information for the connection service of the wagon service A is displayed. The service provider screen 900A is displayed on the provider terminal 80 used by the service provider who is a staff member (salesperson) of the bullet train, when the service use information for the connection service of the wagon service A is received. The service provider screen 900A allows the service provider to check the user who has purchased, which item is purchased, and the seat of the user to deliver the purchased item to the seat of the user.

FIG. 32B is a service provider screen 900B on which the service use information for the connection service of the wagon service B is displayed. The service provider screen 900B is displayed on the provider terminal 80 used by the service provider who is a staff member (salesperson) of the bullet train, when the service use information for the connection service of the wagon service B is received. The service provider screen 900B allows the service provider to check the user who has purchased, and which item is purchased, to put the purchased item aside.

As described above, in case where the information processing system 10 is linked with the seat reservation system 90A, which is an example of the external system 90, the service use system 1 identifies a location of the seat where the touch point 40 is read based on the reservation information, which is registered in the seat reservation system 90A and related to the user, when the touch point 40 that does not depend on a location of seat is read. In addition, the service use system 1 that causes the user terminal 50 to access the connection service associated with the attribute of the seat identified from the user terminal 50 allows the user to use the service corresponding to the set position of the read touch point 40. In addition, the service use system 1 causes the provider terminal 80 to display the information on the seat of the user along with the status of the service use of the user, thereby allowing the service provider to know the seat of the user who is to be provided with the service and provide the wagon service according to the attribute of the seat.

Example of Linking with Reception Room Reservation System

Figure 33:
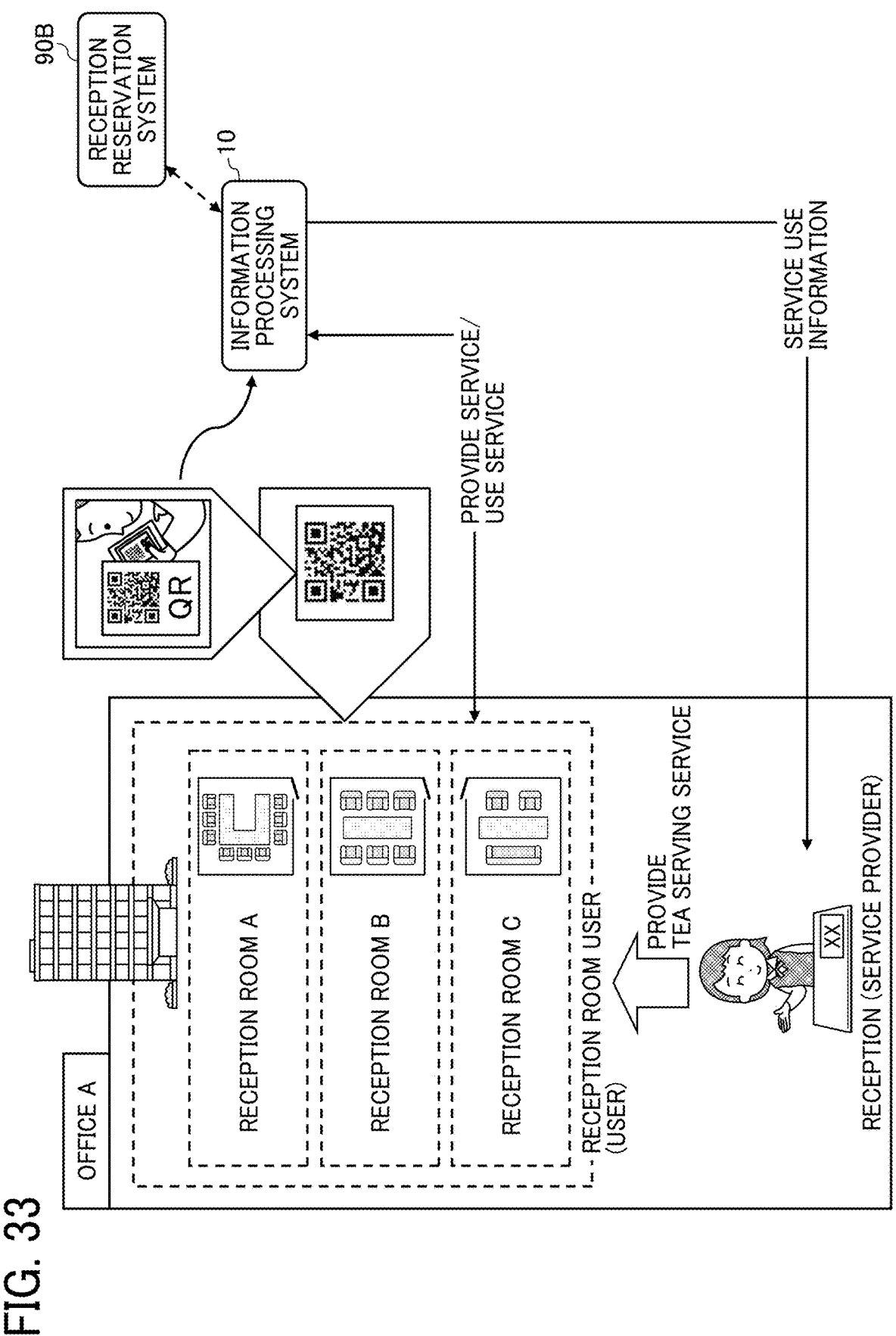
FIG. 33 is a schematic diagram illustrating an example of a service provided by linking with a reception room reservation system according to the exemplary embodiment.

A process for using a connection service provided by system linkage (system integration) between a reception room reservation system as an example of the external system and the information processing system 10 is described below with reference to FIG. 33 to FIG. 39. FIG. 33 is a schematic diagram illustrating an example of a service provided by linking with the reception room reservation system.

In the example illustrated in FIG. 33, an image (for example, QR code) indicating the touch point 40 corresponding to the reception room reservation system (system ID: S002), which is an example of the external system 90 is set at an entrance of each of reception rooms, and a service provided by the service provider that is, for example, a staff member working at a reception of an office is to be available by reading the touch point 40 at the entrance of each reception room reserved by a user.

The same touch point 40 is set at each entrance of a corresponding one of reception rooms (for example, a reception room A, a reception room B, and a reception room C) of an office A. When the touch point 40 set at the entrance of the reception room reserved by the user is read, the user terminal 50 transmits the touch point information including the read touch point ID and account information of the user to the information processing system 10.

The information processing system 10 refers to reception room reservation history of the user by linking with the reception room reservation system 90B, and transmits connection destination information indicating a connection destination of the connection service corresponding to a location (attribute) of the reception room reserved by the user to the user terminal 50. Then, the user uses the user terminal 50 to access the corresponding connection service based on the connection destination information transmitted from the information processing system 10, and uses the service.

In addition, the information processing system 10 transmits service use information indicating the use history of each service of the connection service corresponding to the user to the provider terminal 80 used by the service provider who is a staff member working at the reception of the office A. Then, the service provider checks the user who has used the service, the location of the reception room used by the user, and service use information by browsing the provider terminal 80, and provides a tea serving service to the users who use the reception room.

FIG. 34 is a conceptual diagram illustrating an example of the touch point management table. The touch point management table as illustrated in FIG. 34 is a table for managing various types of information set for each touch point 40 in case of linking with the reception room reservation system 90B (system ID: S002) that is one of the external systems 90. The touch point management table illustrated in FIG. 34 is stored in the touch point management DB 1004 in substantially the same manner as the one example illustrated in FIG. 10, and manages various types of information same as or similar to the ones illustrated in FIG. 10.

In the example illustrated in FIG. 34, with respect to the touch point ID of "T101", the attribute of "OFFICE A, RECEPTION ROOM A" and the connection service of "TEA SERVING A" are associated with each other, the attribute of "OFFICE A, RECEPTION ROOM B" and the connection service of "TEA SERVING B" are associated with each other, and the attribute of "OFFICE A, RECEPTION ROOM C" and the connection service of "ENTRY REGISTRATION" are associated with each other. In addition, a combination of the attribute of "OFFICE A, RECEPTION ROOM A" and the connection service of "TEA SERVING A" and another combination of the attribute of "OFFICE A, RECEPTION ROOM B" and the connection service of "TEA SERVING B" that are associated with the touch point ID of "T101" are associated with "GHI@.nnn.com" that is an account of the service provider. The touch point 40 corresponding to the touch point ID "T101" is set at each reception room of the office A. The user who has read the touch point 40 receives the service corresponding to each reception room from the service provider, which is a staff member who works at the reception of the office A.

The "TEA SERVING A" that is one of the connection services is a service in which the service provider (a staff member working at the reception) serves a cup of tea to each person using the reception room after the user accesses the connection service and enters the reception room. The "TEA SERVING B" that is one of the connection services is a service in which the service provider (a staff member working at the reception) serves a cup of tea to each guest member using the reception room after the user accesses the connection service and each guest member enters the reception room. The "ENTRY REGISTRATION" that is one of the connection services is a service in which entry registration is performed when the user accesses the connection service and enters the reception room without serving cups of tea from the service provider (a staff member who works at reception). Accordingly, the provider information is not associated with the combination of the attribute of the "OFFICE A, RECEPTION ROOM C" and the connection service of "ENTRY REGISTRATION" in the touch point management table illustrated in FIG. 34. Note that the connection services or details of each service provided from the service provider when the connection service is being used are not limited thereto, and can be appropriately settable according to settings for the touch point 40, which is performed as described above.

With respect to the touch point ID of "T102", the same connection service of "TEA SERVING B" is associated with all attributes ("OFFICE B, RECEPTION ROOM 1", "OFFICE B, RECEPTION ROOM 2", and "OFFICE B, RECEPTION ROOM 3"). In addition, all combinations of attributes and connection services associated with the touch point ID of "T102" are associated with "JKL@&.rrr.com" that is an account of the service provider. The touch point 40 corresponding to the touch point ID "T102" is set at each reception room of an office B. In addition, the user who has read the touch point 40 corresponding to the touch point ID of "T102" accesses the same connection service ("TEA SERVING B") and use the tea serving service in relation to the guest members regardless of which reception room the user uses.

FIG. 35 is a diagram illustrating an example of the registration information stored in an external system. FIG. 35 is a diagram illustrating an example of the registration information stored in the reception room reservation system 90B that is an example of the external system 90. In the registration information illustrated in FIG. 35, a user ID for identifying a user, a password, and reservation information registered in the reception room reservation system 90B are associated with each other.

The user ID and the password are account information of a user who uses the reception room reservation system 90B. In the following description of the present embodiment, similar to FIG. 11, the account information is shared with the information processing system 10 and is the same as the user account information illustrated in FIG. 7. In some embodiments, each of the information processing system 10 and the external system 90 uses account information that is individually registered in the corresponding system.

The reservation information includes a reservation date and time, users of the reception room, reception room information indicating the reserved reception room, and an attribute ID for identifying an attribute of the reserved reception room. The attribute IDs are same as the ones stored in the touch point management table illustrated in FIG. 10. The users of the reception room indicates the number of in-house users and the number of guest users among the users who use the reception room. The users of the reception room may include information indicating account information of each of the users who use the reception room.

Figure 36:
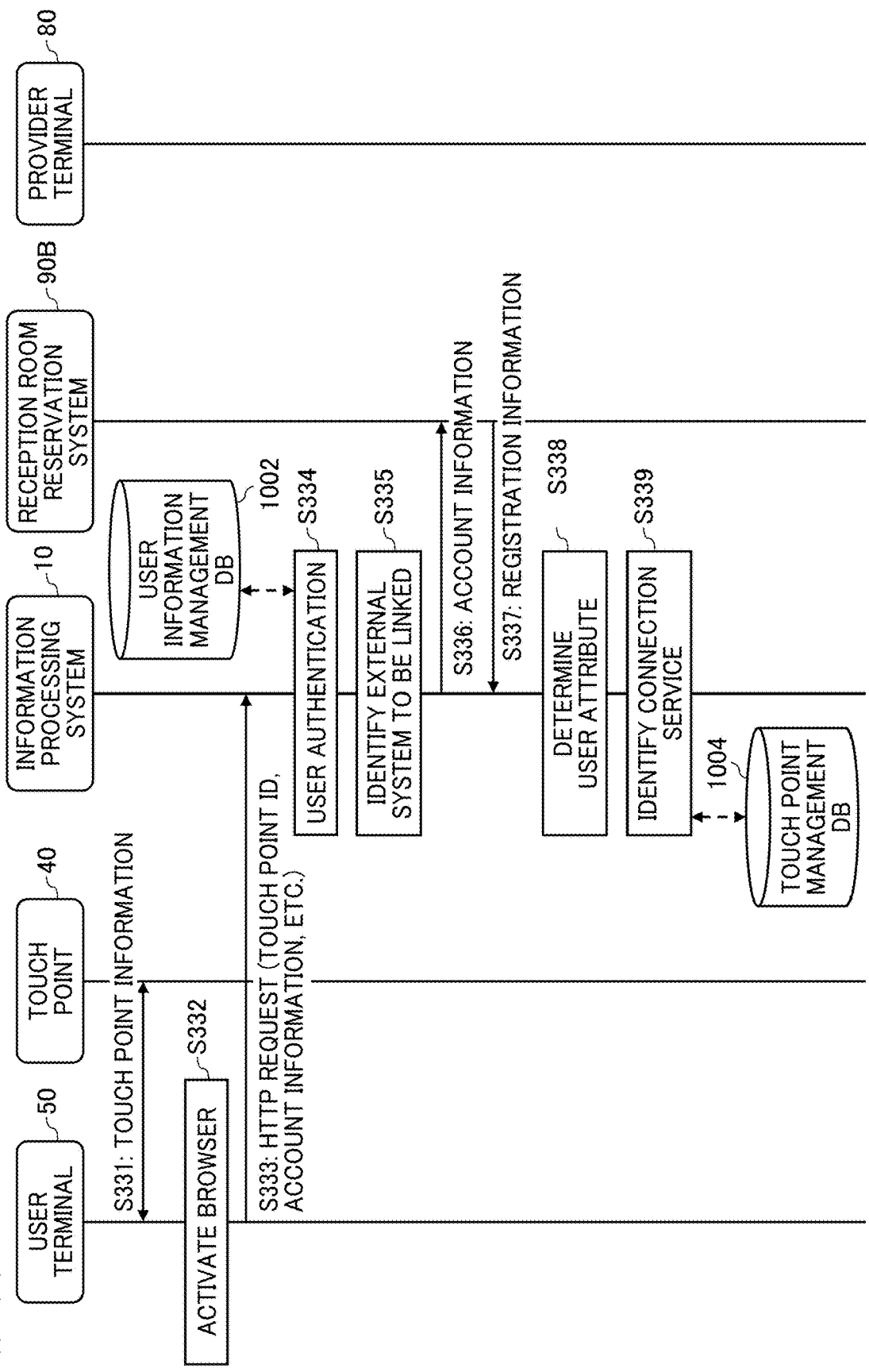
FIG. 36 is a sequence diagram illustrating an example of a process for using a service provided by linking with the reception room reservation system according to the exemplary embodiment.
Figure 37:
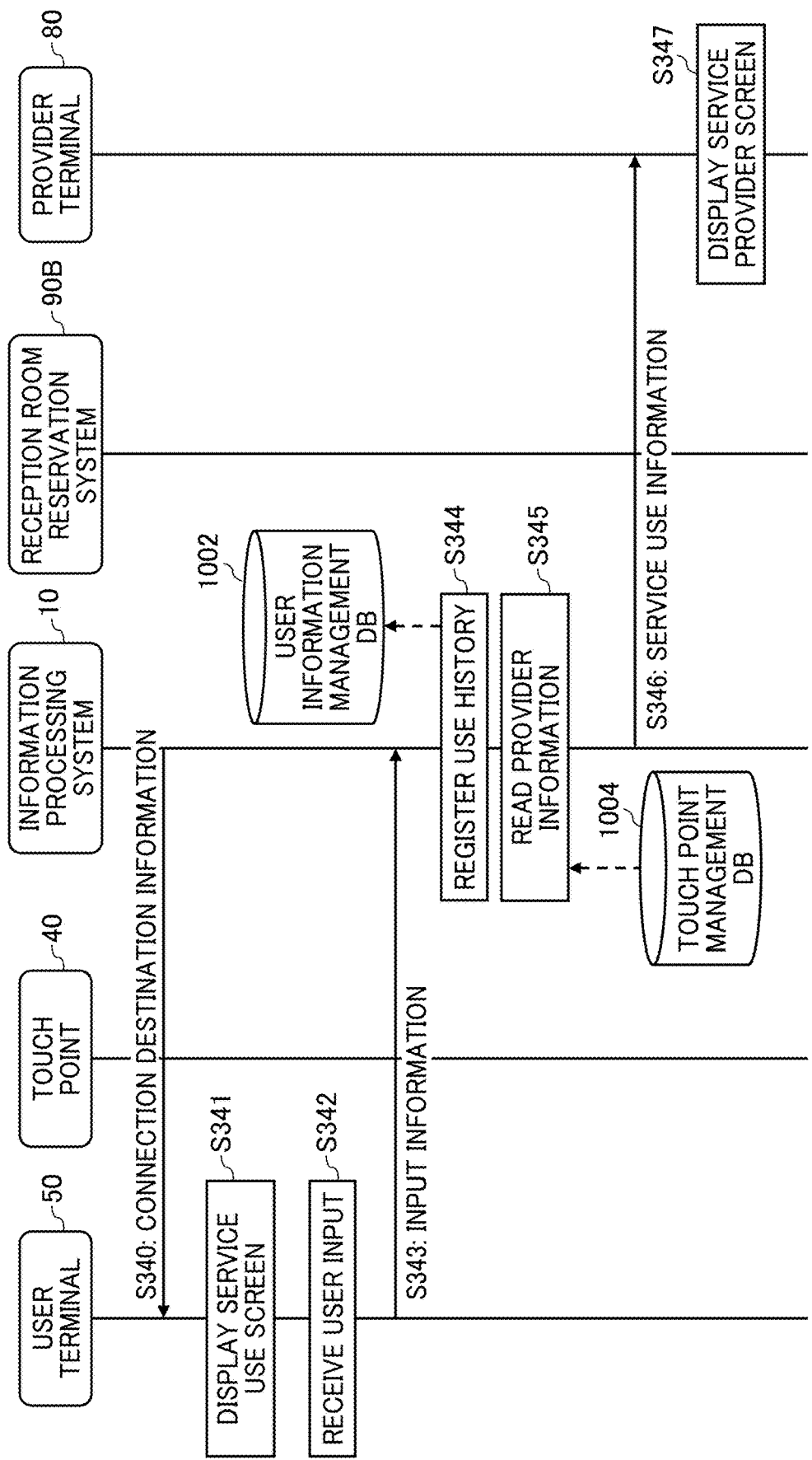
FIG. 37 is a sequence diagram illustrating an example of a process for using a service provided by linking with the reception room reservation system according to the exemplary embodiment.

FIG. 36 and FIG. 37 are sequence diagrams illustrating an example of a process for using a service provided by linking with the reception room reservation system. In the examples of FIG. 36 and FIG. 37, the service is provided by reading the touch point 40 set at the entrance of each reception room of the office A, with the user terminal 50 as illustrated in FIG. 33. Processing from step S331 to step S337 is performed in substantially the same manner as the processing from step S301 to step S307 described above with reference to FIG. 29, and thus redundant descriptions thereof are omitted below.

In step S338, the determination unit 22 of the information processing system 10 determines attributes of the users of the reception room based on the registration information (see FIG. 35) received in step S307. More specifically, the determination unit 22 determines the number of in-house users and the number of guest users among the users of the reception room based on the information on the users of the reception room included in the received registration information. In a case where the information on the users of the reception room included in the received registration information includes individual account information of each user, the determination unit 22 may determine an attribute (whether the user is an in-house user or a guest) of each of the users of the reception room.

Then, the identifying unit 21 identifies a connection service based on the touch point ID received in step S303 and an attribute ID included in the registration information received in step S307 (step S339). More specifically, the identifying unit 21 searches the touch point management DB 1004 (see FIG. 34) using the received touch point ID and the registration information as search keys to identify attribute information associated with the touch point ID and attribute ID, which are received. Then, the identifying unit 21 identifies connection service information associated with the identified attribute information as a connection service.

Referring to FIG. 37, then, the service unit 12 transmits the connection destination information corresponding to the connection service identified in step S339 to the user terminal 50 that is the request source (step S340). Then, the browser unit 51 of the user terminal 50 starts using a service by accessing a connection destination indicated by the connection destination information transmitted from the information processing system 10. The display control unit 54 of the user terminal 50 causes a display unit such as the display 518 display to a service use screen implemented in response to the browser unit 51 accessing the corresponding connection destination (step S341).

Figure 38A:
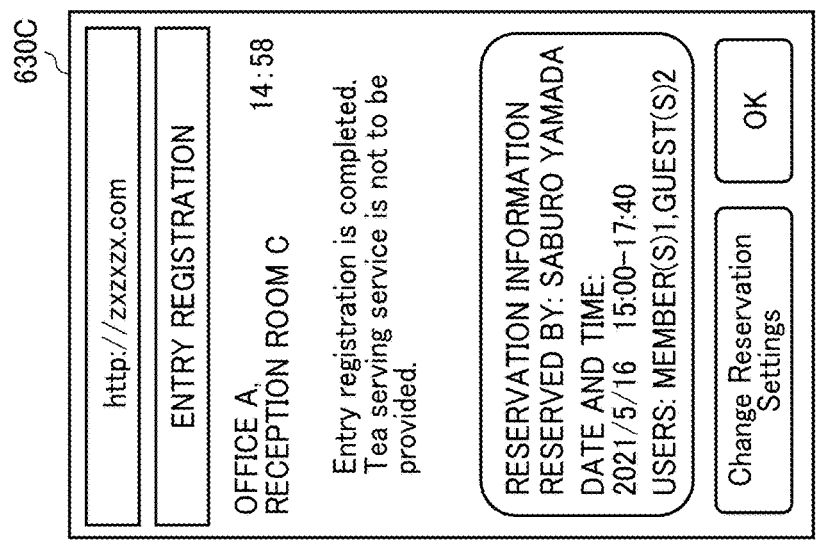
FIG. 38A, FIG. 38B, and FIG. 38C are diagrams each illustrating an example of a service use screen displayed on the user terminal according to the exemplary embodiment.
Figure 38B:
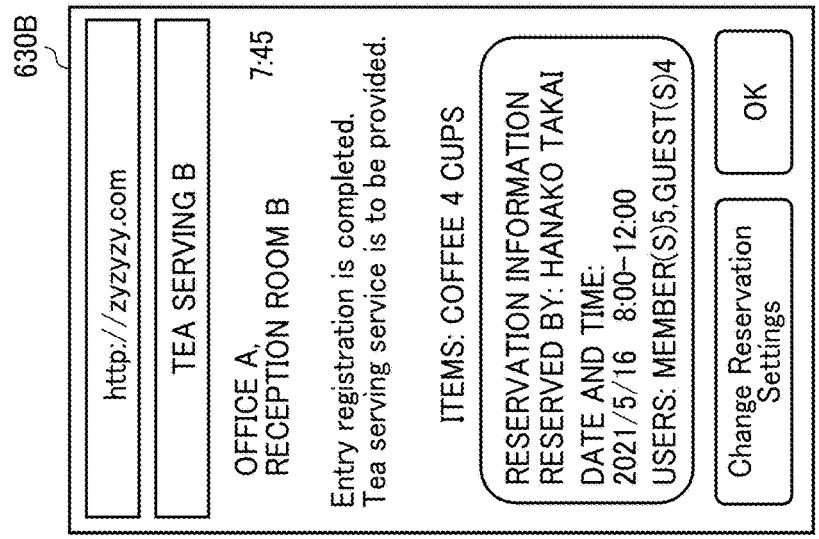
Figure 38C:
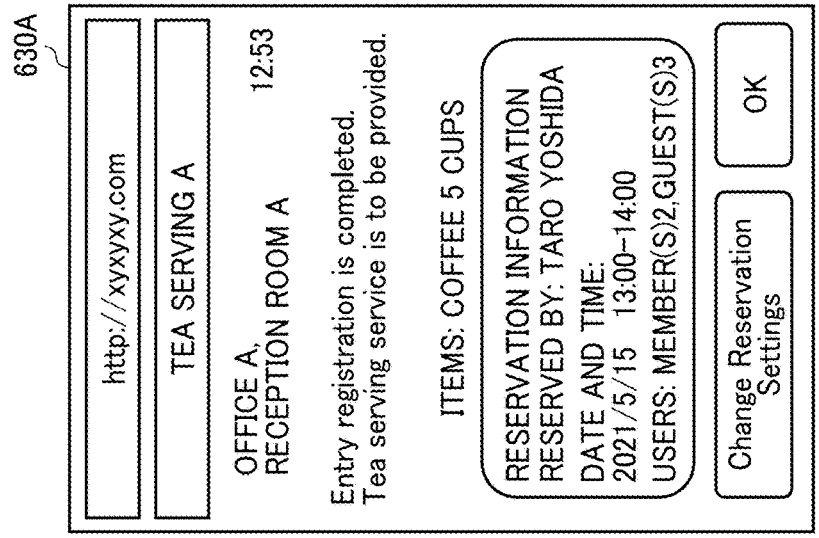

The service use screen displayed on the user terminal 50 allows the user to use the connection service provided from the information processing system 10. The service use screen for each connection service corresponding to an attribute is described below with reference to FIG. 38A, FIG. 38B, and FIG. 38C. FIG. 38A, FIG. 38B, and FIG. 38C are diagrams each illustrating an example of the service use screen displayed on the user terminal.

FIG. 38A is a service use screen 630A displayed on the user terminal 50 of the user who uses the reception room A. The service use screen 630A is displayed on the user terminal 50 used by the user who uses the reception room A by accessing the connection service corresponding to a tea serving A. The service use screen 630A allows the user to use a tea serving service with which all members are to be served with drinks from a staff member working at the reception of the office A by pressing an OK button for confirming the reservation information or the number of drinks to be served.

FIG. 38B is a service use screen 630B displayed on the user terminal 50 of the user who uses the reception room B. The service use screen 630B is displayed on the user terminal 50 used by the user who uses the reception room B by accessing the connection service corresponding to a tea serving B. The service use screen 630B allows the user to use a tea serving service with which the guest members are to be served with drinks from a staff member working at the reception of the office A by pressing an OK button for confirming the reservation information or the number of drinks to be served.

FIG. 38C is a service use screen 630C displayed on the user terminal 50 of the user who uses the reception room C. The service use screen 630C is displayed on the user terminal 50 used by the user of the reception room C by accessing the connection service corresponding to a service of entry registration. In this case, unlike the cases where the service use screens illustrated in FIG. 38A and FIG. 38B are displayed, the entry registration in relation to the reception room C is available, but not the tea serving service from the reception of the office A.

As described above, the information processing system 10 allows each user to access the corresponding connection destination according to the reception room at which the touch point 40 read by the user is set, thereby allowing each user to use the service according to the corresponding reception room at which the touch point 40 read by the user is set. In the following description, an example of processing performed in a case where the service use screen corresponding to the tea serving A illustrated in FIG. 38A or the service use screen corresponding to the tea serving B illustrated in FIG. 38B is displayed on the user terminal 50 is given.

Subsequently, the reception unit 53 of the user terminal 50 receives a user input to the service use screen (step S342). Then, the browser unit 51 transmits the input information input in step S342 to the information processing system 10 (step S343). The service unit 12 of the information processing system 10 receives the input information transmitted from the user terminal 50.

Subsequently, the registration unit 15 of the information processing system 10 registers the input information received in step S343 as the service use history corresponding to the user (step S344). More specifically, the registration unit 15 registers the input information received in step S333 in the user information management DB 1002 (see FIG. 8) as the information of use history corresponding to the account information received in step S343.

Subsequently, the storing/reading unit 19 searches the touch point management DB 1004 (see FIG. 34) using the touch point ID received in step S333 and the attribute information and the connection service information identified in step S339 as search keys to read the provider information associated with the received touch point ID and the specified combination of attribute information and connection service information (step S345).

Subsequently, the service unit 12 transmits the service use information with respect to the account information of the service provider indicated in the provider information read in step S345 (step S346). The service use information includes the input information received in step S343, information used to identify an attribute of each user using the reception room (for example, the attribute of each user determined in step S338), and information indicating the reception room used by the user (for example, reception room information included in the registration information received in step S337). The browser unit 81 of the provider terminal 80 used by the service provider receives the service use information transmitted from the information processing system 10.

The display control unit 83 of the provider terminal 80 causes a display unit such as the display 518 to display a service provider screen implemented by the browser unit 81 (step S347). The service use information received in step S346 is displayed on the service provider screen. The service provider checks the information indicating the reception room and the information on the attributes of the users indicated on the service provider screen displayed on the provider terminal 80 and then provides the corresponding tea serving service to the users. The service provider screen indicating service use information of a user who are using the connection service corresponding to each attribute is described below with reference to FIG. 39A and FIG. 39B.

FIG. 39A and FIG. 39B are diagrams each illustrating an example of the service provider screen displayed on the provider terminal.

FIG. 39A is a service provider screen 930A on which the service use information for the connection service of the tea serving A is displayed. The service provider screen 930A is displayed on the provider terminal 80 used by the service provider who is a staff member working at the reception of the office A, when the service use information for the connection service of the tea serving A is received. The service provider screen 930A allows the service provider to check details of drinks to be served, the reception room to which the drinks are to be served, and the reservation information to serves the drinks to all users of the reception room.

FIG. 39B is a service provider screen 930B on which the service use information for the connection service of the tea serving B is displayed. The service provider screen 930B is displayed on the provider terminal 80 used by the service provider who is a staff member working at the reception of the office A, when the service use information for the connection service of the tea serving B is received. The service provider screen 930B allows the service provider to check details of drinks to be served, the reception room to which the drinks are to be served, and the reservation information to serves the drinks to the guest users of the reception room.

As described above, in case where the information processing system 10 is linked with the reception room reservation system 90B, which is an example of the external system 90, the service use system 1 identifies a reception room where the touch point 40 is read based on the reservation information, which is registered in the reception room reservation system 90B and related to the user, when the touch point 40 that does not depend on a location of reception room is read. In addition, the service use system 1 that causes the user terminal 50 to access the connection service associated with the attribute of the reception room identified from the user terminal 50 allows the user to use the service corresponding to the set position (set location) of the read touch point 40. In addition, the service use system 1 causes the provider terminal 80 to display the information on the reception room and the attributes of the users along with the status of the service use of the user, thereby allowing the service provider to know the reception room and the users to provide the tea serving service according to the reception room and the users.

The processing of determining the user attribute in step S338 of FIG. 36 may not be performed, and the service to be provided may be identified based on the set location of the touch point 40 as illustrated in FIG. 29 and FIG. 30. In the above description of the present embodiment, the service is provided when the user who has reserved the reception room reads the touch point 40. In some embodiments, each of the users who attends a meeting in the reception room reads the touch point 40. In this case, account of each of the users of the reception room is indicated in the registration information stored in the external system 90, and when any of the users of the reception room reads the touch point 40, the tea serving service is provided to all the users of the reception room, or the tea serving service is provided for each user who has read the touch point 40.

In addition, the service use system 1 may be configured such that the touch point 40 is set on each seat in the reception room and is read by the user. This configuration is effective when the tea serving service is to be provided for each user who has read the touch point 40. In addition, in a case where the touch point 40 is set on for each seat in the reception room, by generating and setting the same touch point 40 for each of the reception rooms instead of office units, the service use system 1 identifies the reception room in which the touch point 40 is read even when a guest whose account is not registered in the registration information has read the touch point 40 and provides the tea serving service to the guest.

Example of Linking with Apartment Management System

A process for using a connection service provided by system linkage (system integration) between an apartment management system as an example of the external system and the information processing system 10 is described below with reference to FIG. 40 to FIG. 43. FIG. 40 is a schematic diagram illustrating an example of a service provided by linking with the apartment management system.

In the example illustrated in FIG. 40, an image (for example, QR code) indicating the touch point 40 corresponding to the apartment management system (system ID: S003), which is an example of the external system 90 is set in each room of an apartment, and a concierge service provided by the service provider that is, for example, a customer support center, or an inquiry center, is to be available by reading the touch point 40 of the room by a user who is a residence of the room.

In each room of A HILLS, the touch point 40 common to all rooms is set. When the touch point 40 set in the room is read by the user, the user terminal 50 transmits the touch point information including the read touch point ID and account information of the user to the information processing system 10.

The information processing system 10 refers to contract information in relation to the room of the apartment by linking with the apartment management system 90C, and transmits to the user terminal 50 provider information of the service provider as a connection destination of the connection service corresponding to a location (attribute) of the room for which the user has signed a contract. Then, the user uses the user terminal 50 to access the corresponding connection service based on the provider information transmitted from the information processing system 10, and uses the service.

The information processing system 10 transmits account information of the user who has read the touch point 40 to the provider terminal 80 used by the service provider which is the customer support center. Then, the service provider uses the provider terminal 80 to provide the concierge service to the user terminal 50 used by the user.

FIG. 41 is a conceptual diagram illustrating an example of the touch point management table. The touch point management table as illustrated in FIG. 41 is a table for managing various types of information set for each touch point 40 in case of linking with the apartment management system 90C (system ID: S003) that is one of the external systems 90. The touch point management table illustrated in FIG. 41 is stored in the touch point management DB 1004 in substantially the same manner as the one example illustrated in FIG. 10, and manages various types of information same as or similar to the ones illustrated in FIG. 10.

In the example illustrated in FIG. 41, with respect to the touch point ID of "T201", the attribute of "A HILLS VIP" and the connection service of "CONCIERGE A" are associated with each other, and the attribute of "A HILLS STANDARD" and the connection service of "CONCIERGE B" are associated with each other. In addition, a combination of the attribute of "A HILLS VIP" and the connection service of "CONCIERGE A" that is associated with the touch point ID of "T201" is associated with "MNO@.jkj.com" that is an account of a service provider, and another combination of the attribute of "A HILLS STANDARD" and the connection service of "CONCIERGE B" that is associated with the touch point ID of "T201" is associated with "PQR@.jkj.com" that is an account of a service provider. The touch point 40 corresponding to the touch point ID "T201" is set in each room of the apartment of A HILLS. The user who has read the touch point 40 receives the service corresponding to each room from the service provider, which is the customer support.

In addition, as connection destination information of each of the connection services, "CONCIERGE A" and "CONCIERGE B," the account information of the service provider same as the associated provider information is indicated. One of the connection services, "CONCIERGE A," is a service that causes the user who accesses the connection service to connect to the customer support center (service provider) for VIP users and supports the user by voice communications or video communications, for example. One of the connection services, "CONCIERGE B," is a service that causes the user who accesses the connection service to connect to the customer support center (service provider) for standard users and supports the user by voice communications or video communications, for example. Note that the connection services or details of each service provided from the service provider when the connection service is being used are not limited thereto, and can be appropriately settable according to settings for the touch point 40, which is performed as described above.

In the example illustrated in FIG. 41, with respect to the touch point ID of "T202", the attribute of "B HEIGHTS VIP" and the connection service of "CONCIERGE A" are associated with each other, and the attribute of "B HEIGHTS STANDARD" and the connection service of "CONCIERGE B" are associated with each other. In addition, a combination of the attribute of "B HEIGHTS VIP" and the connection service of "CONCIERGE A" that is associated with the touch point ID of "T202" is associated with "MNO@.jkj.com" that is an account of a service provider, and another combination of the attribute of "B HEIGHTS STANDARD" and the connection service of "CONCIERGE B" that is associated with the touch point ID of "T202" is associated with "PQR@.jkj.com" that is an account of a service provider. The touch point 40 corresponding to the touch point ID "T202" is set in each room of the apartment of B HEIGHTS. The user who has read the touch point 40 receives the service corresponding to each room from the service provider, which is the customer support.

FIG. 42 is a diagram illustrating an example of the registration information stored in an external system. FIG. 42 is a diagram illustrating an example of the registration information stored in the apartment management system 90C that is an example of the external system 90. In the registration information illustrated in FIG. 42, a user ID for identifying a user, a password, and contract information registered in the apartment management system 90C are associated with each other.

The user ID and the password are account information of a user who uses the reception room reservation system 90B. In the following description of the present embodiment, similar to FIG. 11, the account information is shared with the information processing system 10 and is the same as the user account information illustrated in FIG. 7. In some embodiments, each of the information processing system 10 and the external system 90 uses account information that is individually registered in the corresponding system.

The contract information includes residence information of each user and an attribute ID for identifying an attribute of a contracted room. The attribute IDs are same as the ones stored in the touch point management table illustrated in FIG. 10. For example, the apartment management system 90C assigns an attribute ID (P201) corresponding to VIP to a room on a high floor (for example, 20th floor or higher), and assigns an attribute ID (P202, P212) corresponding to standard to a room on a low floor (for example, 19 floor or lower).

Figure 43:
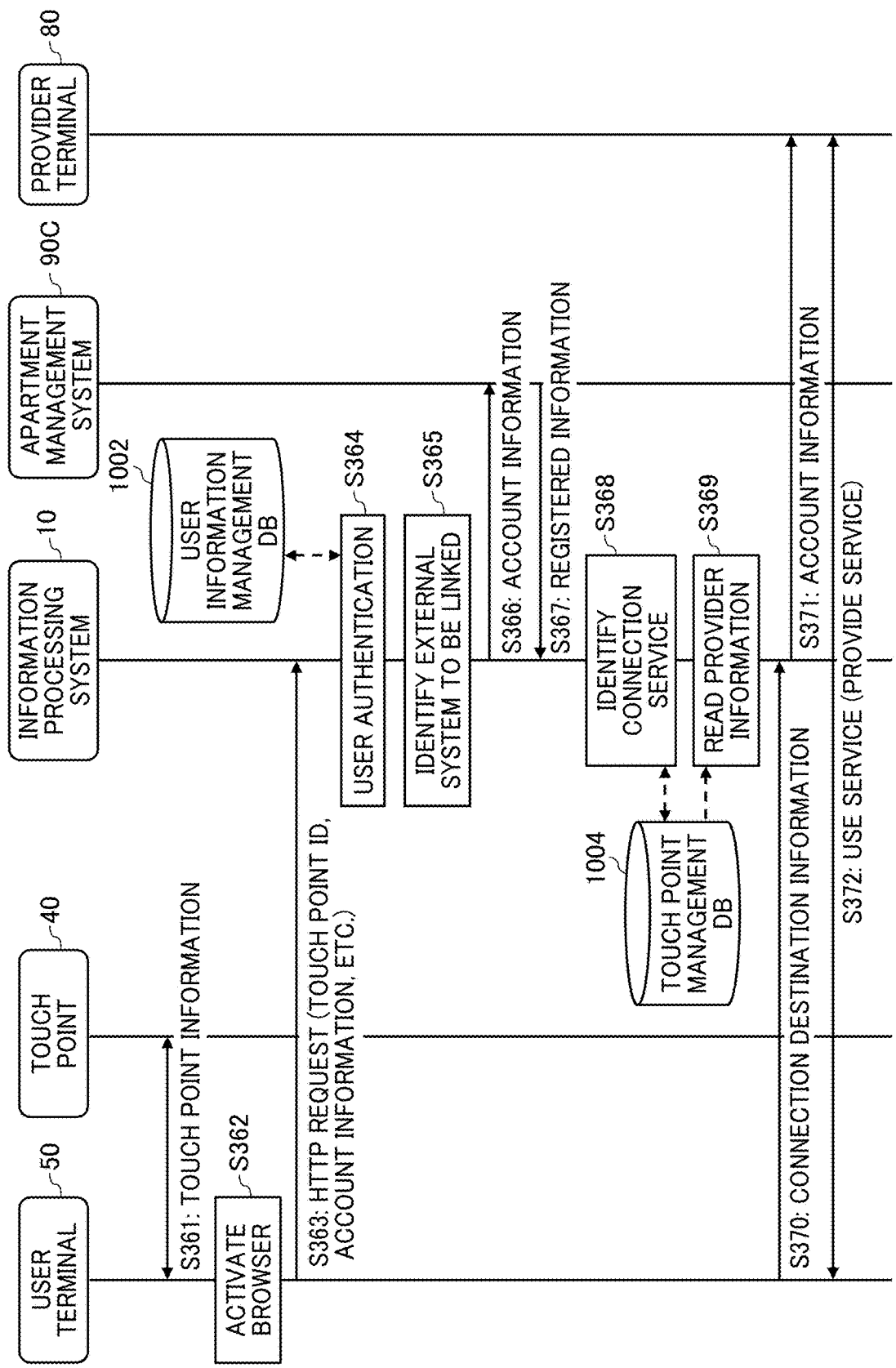
FIG. 43 is a sequence diagram illustrating an example of a process for using a service provided by linking with the apartment management system according to the exemplary embodiment.

FIG. 43 is a sequence diagram illustrating an example of a process for using a service provided by linking with the apartment management system. In the examples of FIG. 43, the service is provided by reading the touch point 40 set in each room of the apartment of A HILLS with the user terminal 50 as illustrated in FIG. 40. Processing from step S361 to step S368 is performed in substantially the same manner as the processing from step S301 to step S308 described above with reference to FIG. 29, and thus redundant descriptions thereof are omitted below.

In step S369, the storing/reading unit 19 searches the touch point management DB 1004 (see FIG. 41) using the touch point ID received in step S363 and the attribute information and the connection service information identified in step S368 as search keys to read the provider information associated with the received touch point ID and the specified combination of attribute information and connection service information (step S369).

Then, the service unit 12 transmits the connection destination information (provider information) read in step S368 to the user terminal 50 that is the request source (step S370). In addition, the service unit 12 transmits the account information of the user received in step S363 with respect to the account information of the service provider indicated in the provider information read in step S369 (step S371). Then, the user terminal 50 accesses the account of the service provider indicated by the connection destination information received in step S370 to use the concierge service provided by the service provider by voice communications or video communications, for example. Similarly, the provider terminal 80 used by the service provider provides the corresponding concierge service to the user by accessing the account of the user received in step S371.

As described above, in case where the information processing system 10 is linked with the apartment management system 90C, which is an example of the external system 90, the service use system 1 identifies a location of the room where the touch point 40 is read based on the contract information, which is registered in the apartment management system 90C and related to the user, when the touch point 40 that does not depend on a location of room is read. In addition, the service use system 1 that causes the user terminal 50 to access the connection service associated with the attribute of the room identified from the user terminal 50 allows the user to use the service corresponding to the set position (set location) of the read touch point 40. In addition, the service use system 1 provides the concierge service corresponding to the attribute of the room by notifying the account information of the user to who the service is to be provided to the service provider (customer support center) corresponding to the attribute of the identified room.

As illustrated in FIGS. 28 to 43, the service use system 1 provides to each user a corresponding one of the different services according to a set position (set location) of the touch point 40 even when the same touch point 40 that does not depend on a set position is read, based on a combination of one of the external systems 90 to be linked, an attribute indicating a set position of the touch point 40, and a connection service. The combination is set with the information processing system 10. The external systems 90 and the services provided by each service provider illustrated in FIG. 28 to FIG. 43 are examples but not limiting the disclosure, and even in a case of a different type of external system 90 and a different service provided by a service provider, the service is available in a substantially same manner by setting various types of information to be associated with the touch point 40 with the information processing system 10 in advance.

As described above, even when the same touch point 40 that does not depend on a set position (set location) is used and read, the service use system 1 provides a corresponding one of the different services according to each location where a user reads the touch point 40 by using the registration information related to the user registered in the external system 90. In addition, by using the same touch point 40 that does not depend on a set position (set location), the service use system 1 according to any one of the above-described embodiments reduces the workload of a worker who sets the touch point 40 while providing, an appropriate service according to a location where a user reads the touch point 40.

In addition, the service use system 1 sets an attribute indicating a set position, or a set location, of the touch point 40 and a connection service for each attribute with respect to the same touch point 40 by linking the information processing system 10 and the external system 90 with each other. Accordingly, even when the same touch point 40 that does not depend on the set position (set location) is read, the service use system 1 provides the different services according to an attribute of the set position (set location) of the touch point 40 that has read. In addition, the service use system 1 dynamically changes the service to be provided to each user through the touch point 40 by setting different combinations of the attribute and the connection service with the information processing system 10.

In the description given above, examples of the external system 90 include a seat reservation system for a public transportation such as a bullet train or an airplane, a reception room reservation system in an office, and an apartment management system used by a management company that manages an apartment residence contract. However, the external system 90 that is to be linked with the information processing system 10 is not limited thereto. For example, the seat reservation system is not limited to be used in public transportation such as a bullet train or an airplane, and may be used for seats in an office, a school, a place for sports spectating, a theater, a movie theater, or a commercial facility, for example. In addition, the reception room reservation system is not limited to be used for a reception room in an office, and may be used as a shared space reservation system that reserves and manages a shared space such as a reception room, a conference room, and a remote workspace, for example. In other words, the external system 90 is a resource management system for reserving and managing various resources associated with the user.

With a related method, when one of a plurality of different types of services is desired to be provided to a user according to a set location of a touch point such as a QR code that is a contact point between the user and the services, the touch point is created and set for each type of the services. With another related method in which the same touch point that does not depend on a set location is used for a plurality of set locations, information indicating where the touch point is read is not obtained by a service provider.

According to one of the embodiments of the present disclosure, one of different types of services is to be provided according to a corresponding one of a plurality of set locations of a touch point by using the same touch point set at each of the plurality of set locations.

According to one of the embodiments of the present disclosure, a non-transitory recording medium storing a plurality of instructions which, when executed by one or more processors, causes the processors to perform a method is provided. The method includes acquiring an external system identification information identifying an external system to be linked through a touch point read with a user terminal used by a user, identifying, based on registration information stored in the external system identified by the external system identification information and related to the user, attribute information indicating an attribute corresponding to a set location of the touch point through which a service corresponding to the attribute is to be provided, and transmitting, to the user terminal, connection destination information indicating a connection destination of the service corresponding to the attribute.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for the machine learning, for example, any one of supervised learning, unsupervised learning, semi-supervised learning, reinforcement learning, and deep learning, or a combination of two or more of these learning.

Although the information processing system, the service use system, the information processing method, and the program according to one or more embodiments of the present disclosure have been described above, the present disclosure may be modified within the scope of those skilled in the art, such as other embodiments, additions, modifications, deletions, etc., and as long as effects of the present disclosure are exhibited in any of the embodiments, the embodiments are included in the scope of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing system, comprising circuitry configured to:
acquire an external system identification information identifying an external system to be linked through a touch point which is read with a user terminal used by a user;
identify, based on registration information stored in the external system identified by the external system identification information and related to the user and a touch point management database, attribute information indicating an attribute corresponding to a set location of the touch point through which a service corresponding to the attribute is to be provided; and
transmit, to the user terminal, connection destination information indicating a connection destination of the service corresponding to the attribute,
wherein in the touch point management database, a touch point ID for identifying the touch point, the attribute information indicating the attribute corresponding to the set location of the touch point, and the connection destination information indicating the connection destination of the service corresponding to the attribute are in association with each other.

2. The information processing system of claim 1, wherein the attribute is one of a plurality of attributes, and the connection destination is one of a plurality of connection destinations, and
the circuitry
sets, for each of the plurality of attributes, a corresponding one of the plurality of connection destinations,
identifies the connection destination associated with the attribute, and
transmit, to the user terminal, the connection destination information indicating the connection destination.

3. The information processing system of claim 1, wherein the circuitry
stores, in a memory, the external system identification information and touch point identification information in association with each other, the touch point identification information identifying the touch point, and
acquires the external system identification information associated with the touch point identification information identifying the touch point read with the user terminal.

4. The information processing system of claim 1, wherein the circuitry
receives service use information corresponding to the attribute information identified via the user terminal, and
transmit, to a provider terminal used by a service provider, the service use information, the attribute information, and user identification information that identifies the user.

5. The information processing system of claim 1, wherein the touch point includes a two-dimensional code and is set at a plurality of locations in a site.

6. The information processing system of claim 1, wherein the external system includes a resource management system that manages one or more resources.

7. The information processing system of claim 6, wherein the resource management system includes a seat reservation system that manages one or more seats as the one or more resources, and
the registration information includes reservation information stored in the seat reservation system, the reservation information indicating information on a reservation made by the user.

8. The information processing system of claim 6, wherein the resource management system includes a shared space reservation system that manages one or more shared spaces as the one or more resources, and
the registration information includes reservation information stored in the shared space reservation system, the reservation information indicating information on a reservation made by the user.

9. The information processing system of claim 6, wherein the external system includes an apartment management system that manages one or more apartments as the one or more resources, and
the registration information includes contract information stored in the apartment management system, the contract information indicating information on a contract signed by the user.

10. A system, comprising:
an information processing system including information processing system circuitry; and
a user terminal including user terminal circuitry,
the information processing system circuitry being configured to
acquire an external system identification information identifying an external system to be linked through a touch point read with the user terminal used by a user,
identify, based on registration information stored in the external system identified by the external system identification information and related to the user and a touch point management database, attribute information indicating an attribute corresponding to a set location of the touch point through which a service corresponding to the attribute is to be provided, and
transmit, to the user terminal, connection destination information indicating a connection destination of the service corresponding to the attribute,
wherein in the touch point management database, a touch point ID for identifying the touch point, the attribute information indicating the attribute corresponding to the set location of the touch point, and the connection destination information indicating the connection destination of the service corresponding to the attribute are in association with each other, the user terminal circuitry being configured to
read the touch point,
transmit, to the information processing system circuitry, information obtained in reading the touch point, and
access the connection destination indicated by the connection destination information transmitted from the information processing system circuitry to control a display to display a service use screen.

11. The system of claim 10, further comprising an administrator terminal including administrator terminal circuitry configured to
receive input of a combination of each of a plurality of attributes including the attribute and a corresponding one of a plurality of connection destinations including the connection destination, and
set, for each of the plurality of attributes, a corresponding one of the plurality of connection destinations associated with the external system identification information, based on the input.

12. An information processing method, comprising:
acquiring an external system identification information identifying an external system to be linked through a touch point read with a user terminal used by a user;
identifying, based on registration information stored in the external system identified by the external system identification information and related to the user and a touch point management database, attribute information indicating an attribute corresponding to a set location of the touch point through which a service corresponding to the attribute is to be provided; and
transmitting, to the user terminal, connection destination information indicating a connection destination of the service corresponding to the attribute,
wherein in the touch point management database, a touch point ID for identifying the touch point, the attribute information indicating the attribute corresponding to the set location of the touch point, and the connection destination information indicating the connection destination of the service corresponding to the attribute are in association with each other.

13. The information processing method of claim 12, wherein
the attribute is one of a plurality of attributes, and the connection destination is one of a plurality of connection destinations, and
the information processing method further comprising
setting, for each of the plurality of attributes, a corresponding one of the plurality of connection destinations,
identifying the connection destination associated with the attribute, and
transmitting, to the user terminal, the connection destination information indicating the connection destination.

14. The information processing method of claim 12, further comprising:
storing, in a memory, the external system identification information and touch point identification information in association with each other, the touch point identification information identifying the touch point; and
acquiring the external system identification information associated with the touch point identification information identifying the touch point read with the user terminal.

15. The information processing method of claim 12, further comprising:
receiving service use information corresponding to the attribute information identified via the user terminal, and
transmitting, to a provider terminal used by a service provider, the service use information, the attribute information, and user identification information that identifies the user.

16. The information processing method of claim 12, wherein
the touch point includes a two-dimensional code and is set at a plurality of locations in a site.

* * * * *